US012262195B2

(12) United States Patent
Laitinen et al.

(10) Patent No.: US 12,262,195 B2
(45) Date of Patent: *Mar. 25, 2025

(54) 6DOF RENDERING OF MICROPHONE-ARRAY CAPTURED AUDIO FOR LOCATIONS OUTSIDE THE MICROPHONE-ARRAYS

(71) Applicant: Nokia Technologies Oy, Espoo (FI)

(72) Inventors: Mikko-Ville Laitinen, Espoo (FI); Archontis Politis, Tampere (FI); Lauros Anton Pajunen, Helsinki (FI); Juha Tapio Vilkamo, Helsinki (FI); Antti Johannes Eronen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 164 days.

This patent is subject to a terminal disclaimer.

(21) Appl. No.: 17/960,459

(22) Filed: Oct. 5, 2022

(65) Prior Publication Data

US 2023/0110257 A1 Apr. 13, 2023

(30) Foreign Application Priority Data

Oct. 8, 2021 (EP) .................................... 21201766

(51) Int. Cl.
*H04S 7/00* (2006.01)
*H04R 3/00* (2006.01)
(Continued)

(52) U.S. Cl.
CPC ............ *H04S 7/304* (2013.01); *H04R 3/005* (2013.01); *H04R 5/027* (2013.01); *H04S 3/008* (2013.01);
(Continued)

(58) Field of Classification Search
None
See application file for complete search history.

(56) References Cited

U.S. PATENT DOCUMENTS 10,514,769 B2 12/2019 Aurongzeb
10,869,152 B1 12/2020 Walsh
(Continued)

FOREIGN PATENT DOCUMENTS

GB 2545275 A 6/2017
GB 2554446 A 4/2018
(Continued)

*Primary Examiner* — Qin Zhu
(74) *Attorney, Agent, or Firm* — McCarter & English, LLP

(57) ABSTRACT

An apparatus for generating a spatialized audio output based on a listener position, the apparatus including circuitry configured to: obtain two or more audio signal sets; obtain a listener position within an audio environment, wherein the audio environment includes one or more area having one or more inside and outside regions in relation to the respective audio signal set positions; obtain metadata based on a processing of the at least two audio signals; determine, for the listener position within an audio environment outside the inside region, a second listener position; determine modified metadata for the second listener position based on the metadata; determine at least two modified audio signals for the second listener position based on the at least two audio signals; determine spatial metadata for the listener position; and output the at least two modified audio signals and the spatial metadata.

21 Claims, 17 Drawing Sheets

(51) Int. Cl.
*H04R 5/027* (2006.01)
*H04S 3/00* (2006.01)

(52) U.S. Cl.
CPC .... *H04R 2201/401* (2013.01); *H04S 2400/01* (2013.01); *H04S 2400/11* (2013.01); *H04S 2400/15* (2013.01); *H04S 2420/11* (2013.01)

(56) References Cited

U.S. PATENT DOCUMENTS

| | | | | |
|---|---|---|---|---|
| 11,532,138 | B2 | 12/2022 | Skidmore | |
| 2011/0025818 | A1 | 2/2011 | Gallmeier | |
| 2015/0117664 | A1 | 4/2015 | Mossner | |
| 2016/0300388 | A1 | 10/2016 | Stafford | |
| 2017/0193704 | A1 | 7/2017 | Leppanen | |
| 2017/0236517 | A1 | 8/2017 | Yu | |
| 2017/0257723 | A1 * | 9/2017 | Morishita | H04S 7/304 |
| 2018/0033203 | A1 | 2/2018 | Ligameri | |
| 2018/0046431 | A1 | 2/2018 | Thagadur Shivappa | |
| 2018/0088900 | A1 | 3/2018 | Glaser | |
| 2018/0302738 | A1 | 10/2018 | Di Censo | |
| 2019/0007781 | A1 | 1/2019 | Peters et al. | |
| 2019/0180509 | A1 | 6/2019 | Laaksonen | |
| 2019/0306651 | A1 | 10/2019 | Vilermo et al. | |
| 2020/0021940 | A1 | 1/2020 | Choueiri et al. | |
| 2020/0029164 | A1 | 1/2020 | Swaminathan | |
| 2020/0175274 | A1 | 6/2020 | Laaksonen | |
| 2020/0312347 | A1 * | 10/2020 | Mate | H04S 7/303 |
| 2021/0358514 | A1 * | 11/2021 | Betts | H04R 1/406 |
| 2022/0005281 | A1 | 1/2022 | Skidmore | |
| 2022/0086586 | A1 * | 3/2022 | Mate | G06T 19/006 |
| 2022/0253149 | A1 | 8/2022 | Berliner | |
| 2022/0254120 | A1 | 8/2022 | Berliner | |

FOREIGN PATENT DOCUMENTS

| | | | | |
|---|---|---|---|---|
| GB | 2556093 | A | 5/2018 | |
| GB | 2572368 | A | 10/2019 | |
| GB | 2587357 | A | 3/2021 | |
| GB | 2592388 | A | 9/2021 | |
| WO | WO-0070489 | A2 * | 11/2000 | A63F 13/12 |
| WO | WO-2019/086757 | A1 | 5/2019 | |
| WO | WO 2021/170900 | A1 | 9/2021 | |

* cited by examiner

6DOF RENDERING OF MICROPHONE-ARRAY CAPTURED AUDIO FOR LOCATIONS OUTSIDE THE MICROPHONE-ARRAYS

FIELD

The present application relates to apparatus and methods for audio rendering with 6 degree of freedom systems of microphone-array captured audio for locations outside the microphone-arrays.

BACKGROUND

Spatial audio capture approaches attempt to capture an audio environment such that the audio environment can be perceptually recreated to a listener in an effective manner and furthermore may permit a listener to move and/or rotate within the recreated audio environment. For example in some systems (3 degrees of freedom—3 DoF) the listener may rotate their head and the rendered audio signals reflect this rotation motion. In some systems (3 degrees of freedom plus—3 DoF+) the listener may 'move' slightly within the environment as well as rotate their head and in others (6 degrees of freedom—6 DoF) the listener may freely move within the environment and rotate their head.

Linear spatial audio capture refers to audio capture methods where the processing does not adapt to the features of the captured audio. Instead, the output is a predetermined linear combination of the captured audio signals.

For recording spatial sound linearly at one position at the recording space, a high-end microphone array is needed. One such microphone is the spherical 32-microphone Eigenmike. From the high-end microphone array a higher-order Ambisonics (HOA) signals can be obtained and used for linear rendering. With the HOA signals, the spatial audio can be linearly rendered so that sounds arriving from different directions are satisfactorily separated in a reasonable auditory bandwidth.

An issue for linear spatial audio capture techniques are the requirements for the microphone arrays. Short wavelengths (higher frequency audio signals) need small microphone spacing, and long wavelengths (lower frequency) need a large array size, and it is difficult to meet both conditions within a single microphone array.

Most practical capture devices (for example virtual reality cameras, single lens reflex cameras, mobile phones) are not equipped with the microphone array such as provided by the Eigenmike and do not have a sufficient microphone arrangement for linear spatial audio capture. Furthermore implementing linear spatial audio capture for capture devices results in a spatial audio obtained only for a single position.

Parametric spatial audio capture refers to systems that estimate perceptually relevant parameters based on the audio signals captured by microphones and, based on these parameters and the audio signals, a spatial sound may be synthesized. The analysis and the synthesis typically takes place in frequency bands which may approximate human spatial hearing resolution.

It is known that for the majority of compact microphone arrangements (e.g., VR-cameras, multi-microphone arrays, mobile phones with microphones, SLR cameras with microphones) parametric spatial audio capture may produce a perceptually accurate spatial audio rendering, whereas the linear approach does not typically produce a feasible result in terms of the spatial aspects of the sound. For high-end microphone arrays, such as the Eigenmike, the parametric approach may furthermore provide on average a better quality spatial sound perception than a linear approach.

SUMMARY

There is provided according to a first aspect an apparatus comprising means configured to: obtain two or more audio signal sets, wherein each of the two or more audio signal sets is associated with a respective audio signal set position; obtain a listener position within an audio environment, wherein the audio environment comprises one or more area having one or more inside and outside regions in relation to the respective audio signal set positions, wherein the inside region is defined by the respective audio signal set positions; obtain, for at least two of the two or more audio signal sets, metadata based on a processing of the at least two audio signals of the at least two of the two or more audio signal sets; determine, for the listener position within an audio environment outside the inside region, a second listener position, the second listener position being located in the outside region and closer towards a boundary of the one or more inside and outside region, or on the boundary, or within the one or more inside region; determine modified metadata for the second listener position based on the metadata; determine at least two modified audio signals for the second listener position based on the at least two audio signals; determine spatial metadata for the listener position based on the modified metadata for the second listener position; and output the at least two modified audio signals and the spatial metadata.

The means configured to determine spatial metadata for the listener position based on the modified metadata for the second listener position may be configured to: determine at least one audio position with respect to the second listener position based on the modified metadata for the second listener position, wherein the modified metadata for the second listener position comprises a direction parameter representing a direction from the second listener position to one of the at least one audio position; determine spatial metadata for the listener position based on the at least one audio signal set position with respect to the second listener position, wherein the the spatial metadata comprises a spatial direction parameter representing a direction from the listener position to the one of the at least one audio position.

The means configured to obtain two or more audio signal sets may be configured to obtain the two or more audio signal sets from microphone arrangements, wherein each microphone arrangement may be at a respective position and comprises one or more microphones.

The means configured to obtain a listener position may be configured to obtain the listener position from a further apparatus.

The means configured to obtain, for the at least two of the two or more audio signal sets, metadata based on a processing of the at least two audio signals of the at least two of the two or more audio signal sets may be configured to determine a directional parameter based on the processing of the at least two audio signals.

The means configured to determine, for the listener position within an audio environment outside the inside region, a second listener position may be configured to determine the second listener position at a location of one of: within a plane or volume at least partially defined by an edge or surface linking the two of the two or more audio signal set positions and the listener position; within a plane or volume at least partially defined by an edge or surface linking the two of the two or more audio signal set positions within an associated inside region; on an edge or surface defined by the two of the two or more audio signal set positions; and at a closest of the two or more audio signal set positions.

The means configured to determine modified metadata for the second listener position based on the metadata may be configured to: generate at least two interpolation weights based on the audio signal set positions and the second listener position; apply the at least two interpolation weights to respective audio signal set audio metadata to generate interpolated audio metadata; and combine the interpolated audio metadata to generate the modified metadata for the second listener position.

The means configured to determine spatial metadata for the listener position based on the modified metadata for the second listener position may be configured to map the modified metadata based on the second listener position to a cartesian co-ordinate system.

The means configured to determine modified at least two modified audio signals for the second listener position based on the at least two audio signals may be configured to generate interpolated audio signals from the at least two audio signals.

The means configured to determine spatial metadata for the listener position based on the at least one audio position with respect to the second listener position, wherein the spatial metadata comprises a spatial direction parameter representing a direction from the listener position to the one of the at least one audio position may be configured to determine the spatial direction parameter based on one of: an interpolated difference between the at least one audio position with respect to the second listener position and the listener position; and a difference between: the listener position; and the at least one audio position with respect to the second listener position.

The means configured to determine spatial metadata for the listener position based on the modified metadata for the second listener position may be configured to modify at least one direct-to-total energy ratio based on the difference between the at least one audio position with respect to the second listener position and the listener position.

The means may be further configured to process the at least two modified audio signals based on the spatial metadata for the listener position to generate a spatial audio output.

The means configured to generate a spatial audio output may be configured to generate at least one of: a binaural audio output comprising two audio signals for headphones and/or earphones; an Ambisonic audio output comprising a plurality of audio signals for an Ambisonic renderer for headphones or a multichannel speaker set; and a multichannel audio output comprising at least two audio signals for a multichannel speaker set.

According to a second aspect there is provided a method for an apparatus for generating a spatialized audio output based on a listener position, the method comprising: obtaining two or more audio signal sets, wherein each of the two or more audio signal sets is associated with a respective audio signal set position; obtaining a listener position within an audio environment, wherein the audio environment comprises one or more area having one or more inside and outside regions in relation to the respective audio signal set positions, wherein the inside region is defined by the respective audio signal set positions; obtaining, for at least two of the two or more audio signal sets, metadata based on a processing of the at least two audio signals of the at least two of the two or more audio signal sets; determining, for the listener position within an audio environment outside the inside region, a second listener position, the second listener position being located in the outside region and closer towards a boundary of the one or more inside and outside region, or on the boundary, or within the one or more inside region; determining modified metadata for the second listener position based on the metadata; determining at least two modified audio signals for the second listener position based on the at least two audio signals; determining spatial metadata for the listener position based on the modified metadata for the second listener position; and outputting the at least two modified audio signals and the spatial metadata.

Determining spatial metadata for the listener position based on the modified metadata for the second listener position may comprise: determining at least one audio position with respect to the second listener position based on the modified metadata for the second listener position, wherein the modified metadata for the second listener position comprises a direction parameter representing a direction from the second listener position to one of the at least one audio position; and determining spatial metadata for the listener position based on the at least one audio signal set position with respect to the second listener position, wherein the the spatial metadata comprises a spatial direction parameter representing a direction from the listener position to the one of the at least one audio position.

Obtaining two or more audio signal sets comprises obtaining the two or more audio signal sets from microphone arrangements, wherein each microphone arrangement may be at a respective position and comprises one or more microphones.

Obtaining a listener position may comprise obtaining the listener position from a further apparatus.

Obtaining, for the at least two of the two or more audio signal sets, metadata based on a processing of the at least two audio signals of the at least two of the two or more audio signal sets may comprose determining a directional parameter based on the processing of the at least two audio signals.

Determining, for the listener position within an audio environment outside the inside region, a second listener position may comprise determining the second listener position at a location of one of: within a plane or volume at least partially defined by an edge or surface linking the two of the two or more audio signal set positions and the listener position; within a plane or volume at least partially defined by an edge or surface linking the two of the two or more audio signal set positions within an associated inside region; on an edge or surface defined by the two of the two or more audio signal set positions; and at a closest of the two or more audio signal set positions.

Determining modified metadata for the second listener position based on the metadata may comprise: generating at least two interpolation weights based on the audio signal set positions and the second listener position; applying the at least two interpolation weights to respective audio signal set audio metadata to generate interpolated audio metadata; and combining the interpolated audio metadata to generate the modified metadata for the second listener position.

Determining spatial metadata for the listener position based on the modified metadata for the second listener position may comprise mapping the modified metadata based on the second listener position to a cartesian co-ordinate system.

Determining modified at least two modified audio signals for the second listener position based on the at least two audio signals may comprise generating interpolated audio signals from the at least two audio signals.

Determining spatial metadata for the listener position based on the at least one audio position with respect to the second listener position, wherein the spatial metadata comprises a spatial direction parameter representing a direction from the listener position to the one of the at least one audio position may comprise determining the spatial direction parameter based on one of: an interpolated difference between the at least one audio position with respect to the second listener position and the listener position; and a difference between: the listener position; and the at least one audio position with respect to the second listener position.

Determining spatial metadata for the listener position based on the modified metadata for the second listener position may comprise modifing at least one direct-to-total energy ratio based on the difference between the at least one audio position with respect to the second listener position and the listener position.

The method may further comprise processing the at least two modified audio signals based on the spatial metadata for the listener position to generate a spatial audio output.

Generating the spatial audio output may comprise generating at least one of: a binaural audio output comprising two audio signals for headphones and/or earphones; an Ambisonic audio output comprising a plurality of audio signals for an Ambisonic renderer for headphones or a multichannel speaker set; and a multichannel audio output comprising at least two audio signals for a multichannel speaker set.

According to a third aspect there is provided an apparatus comprising at least one processor and at least one memory including a computer program code, the at least one memory and the computer program code configured to, with the at least one processor, cause the apparatus at least to: obtain two or more audio signal sets, wherein each of the two or more audio signal sets is associated with a respective audio signal set position; obtain a listener position within an audio environment, wherein the audio environment comprises one or more area having one or more inside and outside regions in relation to the respective audio signal set positions, wherein the inside region is defined by the respective audio signal set positions; obtain, for at least two of the two or more audio signal sets, metadata based on a processing of the at least two audio signals of the at least two of the two or more audio signal sets; determine, for the listener position within an audio environment outside the inside region, a second listener position, the second listener position being located in the outside region and closer towards a boundary of the one or more inside and outside region, or on the boundary, or within the one or more inside region; determine modified metadata for the second listener position based on the metadata; determine at least two modified audio signals for the second listener position based on the at least two audio signals; determine spatial metadata for the listener position based on the modified metadata for the second listener position; and output the at least two modified audio signals and the spatial metadata.

The apparatus caused to determine spatial metadata for the listener position based on the modified metadata for the second listener position may be caused to: determine at least one audio position with respect to the second listener position based on the modified metadata for the second listener position, wherein the modified metadata for the second listener position comprises a direction parameter representing a direction from the second listener position to one of the at least one audio position; determine spatial metadata for the listener position based on the at least one audio signal set position with respect to the second listener position, wherein the the spatial metadata comprises a spatial direction parameter representing a direction from the listener position to the one of the at least one audio position.

The apparatus caused to obtain two or more audio signal sets may be caused to obtain the two or more audio signal sets from microphone arrangements, wherein each microphone arrangement may be at a respective position and comprises one or more microphones.

The apparatus caused to obtain a listener position may be caused to obtain the listener position from a further apparatus.

The apparatus caused to obtain, for the at least two of the two or more audio signal sets, metadata based on a processing of the at least two audio signals of the at least two of the two or more audio signal sets may be caused to determine a directional parameter based on the processing of the at least two audio signals.

The apparatus caused to determine, for the listener position within an audio environment outside the inside region, a second listener position may be caused to determine the second listener position at a location of one of: within a plane or volume at least partially defined by an edge or surface linking the two of the two or more audio signal set positions and the listener position; within a plane or volume at least partially defined by an edge or surface linking the two of the two or more audio signal set positions within an associated inside region; on an edge or surface defined by the two of the two or more audio signal set positions; and at a closest of the two or more audio signal set positions.

The apparatus caused to determine modified metadata for the second listener position based on the metadata may be caused to: generate at least two interpolation weights based on the audio signal set positions and the second listener position; apply the at least two interpolation weights to respective audio signal set audio metadata to generate interpolated audio metadata; and combine the interpolated audio metadata to generate the modified metadata for the second listener position.

The apparatus caused to determine spatial metadata for the listener position based on the modified metadata for the second listener position may be caused to map the modified metadata based on the second listener position to a cartesian co-ordinate system.

The apparatus caused to determine modified at least two modified audio signals for the second listener position based on the at least two audio signals may be caused to generate interpolated audio signals from the at least two audio signals.

The apparatus caused to determine spatial metadata for the listener position based on the at least one audio position with respect to the second listener position, wherein the spatial metadata comprises a spatial direction parameter representing a direction from the listener position to the one of the at least one audio position may be caused to determine the spatial direction parameter based on one of: an interpolated difference between the at least one audio position with respect to the second listener position and the listener position; and a difference between: the listener position; and the at least one audio position with respect to the second listener position.

The apparatus caused to determine spatial metadata for the listener position based on the modified metadata for the second listener position may be caused to modify at least one direct-to-total energy ratio based on the difference between the at least one audio position with respect to the second listener position and the listener position.

The apparatus may be further caused to process the at least two modified audio signals based on the spatial metadata for the listener position to generate a spatial audio output.

The apparatus caused to generate a spatial audio output may be caused to generate at least one of: a binaural audio output comprising two audio signals for headphones and/or earphones; an Ambisonic audio output comprising a plurality of audio signals for an Ambisonic renderer for headphones or a multichannel speaker set; and a multichannel audio output comprising at least two audio signals for a multichannel speaker set.

According to a fourth aspect there is provided an apparatus comprising: means for obtaining two or more audio signal sets, wherein each of the two or more audio signal sets is associated with a respective audio signal set position; means for obtaining a listener position within an audio environment, wherein the audio environment comprises one or more area having one or more inside and outside regions in relation to the respective audio signal set positions, wherein the inside region is defined by the respective audio signal set positions; means for obtaining, for at least two of the two or more audio signal sets, metadata based on a processing of the at least two audio signals of the at least two of the two or more audio signal sets; means for determining, for the listener position within an audio environment outside the inside region, a second listener position, the second listener position being located in the outside region and closer towards a boundary of the one or more inside and outside region, or on the boundary, or within the one or more inside region; means for determining modified metadata for the second listener position based on the metadata; means for determining at least two modified audio signals for the second listener position based on the at least two audio signals; means for determining spatial metadata for the listener position based on the modified metadata for the second listener position; and means for outputting the at least two modified audio signals and the spatial metadata.

According to a fifth aspect there is provided a computer program comprising instructions [or a computer readable medium comprising program instructions] for causing an apparatus to perform at least the following: obtaining two or more audio signal sets, wherein each of the two or more audio signal sets is associated with a respective audio signal set position; obtaining a listener position within an audio environment, wherein the audio environment comprises one or more area having one or more inside and outside regions in relation to the respective audio signal set positions, wherein the inside region is defined by the respective audio signal set positions; obtaining, for at least two of the two or more audio signal sets, metadata based on a processing of the at least two audio signals of the at least two of the two or more audio signal sets; determining, for the listener position within an audio environment outside the inside region, a second listener position, the second listener position being located in the outside region and closer towards a boundary of the one or more inside and outside region, or on the boundary, or within the one or more inside region; determining modified metadata for the second listener position based on the metadata; determining at least two modified audio signals for the second listener position based on the at least two audio signals; determining spatial metadata for the listener position based on the modified metadata for the second listener position; and outputting the at least two modified audio signals and the spatial metadata.

According to a sixth aspect there is provided a non-transitory computer readable medium comprising program instructions for causing an apparatus to perform at least the following: obtaining two or more audio signal sets, wherein each of the two or more audio signal sets is associated with a respective audio signal set position; obtaining a listener position within an audio environment, wherein the audio environment comprises one or more area having one or more inside and outside regions in relation to the respective audio signal set positions, wherein the inside region is defined by the respective audio signal set positions; obtaining, for at least two of the two or more audio signal sets, metadata based on a processing of the at least two audio signals of the at least two of the two or more audio signal sets; determining, for the listener position within an audio environment outside the inside region, a second listener position, the second listener position being located in the outside region and closer towards a boundary of the one or more inside and outside region, or on the boundary, or within the one or more inside region; determining modified metadata for the second listener position based on the metadata; determining at least two modified audio signals for the second listener position based on the at least two audio signals; determining spatial metadata for the listener position based on the modified metadata for the second listener position; and outputting the at least two modified audio signals and the spatial metadata.

According to a seventh aspect there is provided an apparatus comprising: obtaining circuitry configured to obtain two or more audio signal sets, wherein each of the two or more audio signal sets is associated with a respective audio signal set position; obtaining circuitry configured to obtain a listener position within an audio environment, wherein the audio environment comprises one or more area having one or more inside and outside regions in relation to the respective audio signal set positions, wherein the inside region is defined by the respective audio signal set positions; obtaining circuitry configured to obtain, for at least two of the two or more audio signal sets, metadata based on a processing of the at least two audio signals of the at least two of the two or more audio signal sets; determining circuitry configured to determine, for the listener position within an audio environment outside the inside region, a second listener position, the second listener position being located in the outside region and closer towards a boundary of the one or more inside and outside region, or on the boundary, or within the one or more inside region; determining circuitry configured to determine modified metadata for the second listener position based on the metadata; determining circuitry configured to determine at least two modified audio signals for the second listener position based on the at least two audio signals; determining circuitry configured to determine spatial metadata for the listener position based on the modified metadata for the second listener position; and outputting circuitry configured to output the at least two modified audio signals and the spatial metadata.

According to an eighth aspect there is provided a computer readable medium comprising program instructions for causing an apparatus to perform at least the following: obtaining two or more audio signal sets, wherein each of the two or more audio signal sets is associated with a respective audio signal set position; obtaining a listener position within an audio environment, wherein the audio environment comprises one or more area having one or more inside and outside regions in relation to the respective audio signal set positions, wherein the inside region is defined by the respective audio signal set positions; obtaining, for at least two of the two or more audio signal sets, metadata based on a processing of the at least two audio signals of the at least two of the two or more audio signal sets; determining, for the listener position within an audio environment outside the inside region, a second listener position, the second listener position being located in the outside region and closer towards a boundary of the one or more inside and outside region, or on the boundary, or within the one or more inside region; determining modified metadata for the second listener position based on the metadata; determining at least two modified audio signals for the second listener position based on the at least two audio signals; determining spatial metadata for the listener position based on the modified metadata for the second listener position; and outputting the at least two modified audio signals and the spatial metadata.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The concept as discussed herein in further detail with respect to the following embodiments is related to the rendering of audio scenes wherein the audio scene was captured based on a parametric spatial audio methods and with two or more microphone-arrays corresponding to different positions at the recording space (or in other words with audio signal sets which are captured at respective signal set positions in the recording space). Furthermore the concept is related to rendering of an audio scene wherein a user (or listener) is enabled to move to different positions both within an area defined by the microphone-arrays and also outside of the area.

6 DoF is presently a commonplace in virtual reality, such as VR games, where movement at the audio scene is straightforward to render as all spatial information is readily available (i.e., the position of each sound source as well as the audio signal of each source separately).

In the following examples the audio signal sets are generated by microphones (or microphone-arrays). For example a microphone arrangement may comprise one or more microphones and generate for the audio signal set one or more audio signals. In some embodiments the audio signal set comprises audio signals which are virtual or generated audio signals (for example a virtual speaker audio signal with an associated virtual speaker location). In some embodiments the microphone-arrays are furthermore separate from or physically located away from any processing apparatus, however this does not preclude examples where the microphones are located on the processing apparatus or are physically connected to the processing apparatus.

Figure 1:
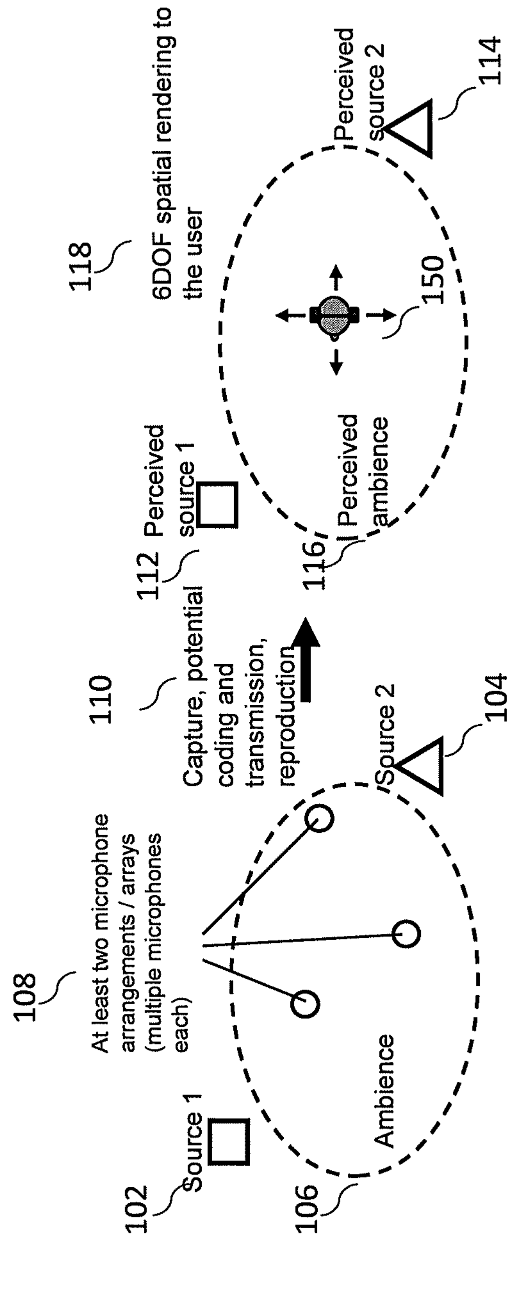
FIG. 1 shows schematically a system of apparatus showing the capture and reproduction of an example sound scene and within which a user can move within the reproduced scene.

Before discussing the concept in further detail we will initially describe in further detail some aspects of spatial capture and reproduction. For example with respect to FIG. 1 is shown an example of spatial capture and playback. Thus for example FIG. 1 shows on the left hand side a spatial audio signal capture environment. The environment or audio scene comprises sound sources, source 1 102 and source 2 104 which may be actual sources of audio signals or may be abstract representations of sound or audio sources. In other words the sound source or source may represent an actual source of sound, such as a musical instrument or represent an abstract source of sound, for example a distributed sound of wind passing through trees. Furthermore a part 106 is shown in FIG. 1 which represents non-directional or non-specific location ambience of the audio scene. These can be captured by at least two microphone arrangements/arrays which can comprise two or more microphones each.

The audio signals can as described above be captured and furthermore may be encoded, transmitted, received and reproduced as shown in FIG. 1 by arrow 110.

An example reproduction is shown on the right hand side of FIG. 1. The reproduction of the spatial audio signals results in the user 150, which in this example is shown wearing head-tracking headphones being presented with a reproduced audio environment in the form of a 6 DoF spatial rendering 118 which comprises a perceived source 1 112 (which is a facsimile of the source 1 102), a perceived source 2 114 (which is a facsimile of the source 2 104) and perceived ambience 116 (which is a facsimile of the ambience 106).

Parametric capture methods have traditionally been presented for only single-point reproduction, but recently a 6 DoF reproduction method allowing free movement was presented. The method presented in UK patent application GB2002710.8 uses at least two microphone arrays, and spatial metadata is analysed for each of the arrays (to determine parameters such as directions and energy ratios for more than one frequency band). At the renderer, 6 DoF audio is rendered using the microphone-array signals and the spatial metadata, based on the listener position and orientation.

The method presented in GB2002710.8 is able to be employed in the scenario as shown with respect to FIG. 1. In this example the audio scene can be captured with a relatively low number of microphone arrays (e.g., six arrays), and the listener can move within the space without any constraints. Moreover, the method employed is fully blind, i.e., no information on the source positions is required.

However, although the method can be employed where the listener is able to move within an area spanned by the microphone arrays, there can be experienced a significant deterioration in the consistency of the audio spatialization where the listener moves outside this area.

As proposed by the method shown with respect to GB2002710.8, for positions outside the area spanned microphone-arrays, a rendering based on a position determined by projecting the listener to the closest edge of the area spanned by the microphone-arrays is generated.

In the following discussion the terms position and location are used interchangeably.

Thus if a sound source is located inside the area spanned by the microphone-arrays, this can produce relatively good quality audio rendering when the listener moves outside the area, as the projection to the edge maintains the sound source position with respect to the correct side of the listener, although the exact direction may be slightly erroneous.

However, if a sound source is located outside the area determined by the microphone-array, the referenced method can produce significant directional errors.

Figure 2:
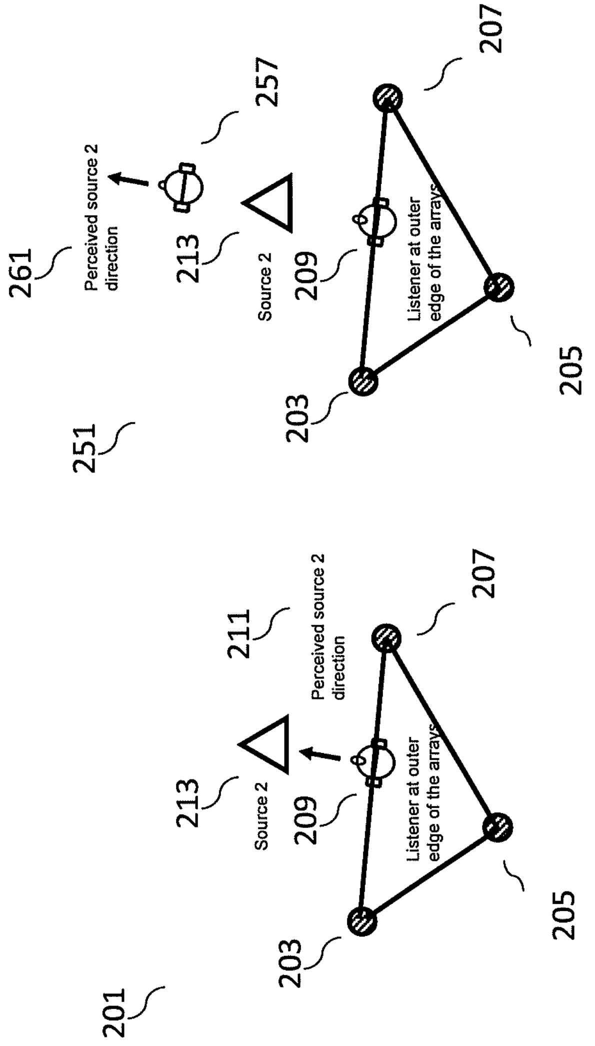
FIG. 2 shows schematically an example reproduction of an audio scene where a user moves outside of an area determined by the microphone-arrays.

This situation is shown with respect to FIG. 2. In this example as shown by the figure on the left side 201, the listener is located at a first position 209 at the outer edge of the area defined by the microphone-arrays 203, 205, 207, and there is a sound source 213 located outside of the area. As shown in the right side 251 of FIG. 2, if the listener moves from the first position 209 to a second position 257, the second position 257 located away from the area determined by the microphone-arrays 203, 205, 207 and past the location of the source 213, the perceived sound source maintains the same direction relative to the listener, even after the listener moves past the source, because the rendering is based on the projected location (and direction as indicated by the arrow reference 261 which is in line from the earlier listener position 259 to the source 213).

This can result in a confusing experience for the listener, as they have no way of perceiving the actual source direction (and that the perceived source direction is incorrect). Furthermore, when the listener is far outside of the area of the microphone-arrays, any movement within the region causes spatial audio rendering that corresponds to the user moving at the edge of the area determined by the microphone-arrays, and therefore the listener is not provided with auditory cues that would help him to navigate back to the main listening area, i.e., the area determined by the microphone array positions.

The method discussed above proposed making the rendering less directional outside of the area spanned by the microphone arrays. This would prevent the rendering of a sound source being perceived as being in a completely incorrect direction as the sound source is rendered having a "fuzzy" direction when outside the area. However, this can still be confusing for the listener as the listener is no longer able to navigate by sound source alone and may not be able to navigate back to the main listening area without assistance.

Therefore, the 6 DoF rendering outside the area spanned by the microphone arrays suffers from significant directional errors and causes a poor user experience, where the user perceives sound source positions incorrectly, and the user does not receive spatial cues to be able to perceive where the area spanned by the microphone arrays is to be able to return there.

The embodiments as described herein thus relate to 6-degree-of-freedom (i.e., the listener can move within the scene and the listener position is tracked) binaural (and other spatial output format) rendering of audio captured with at least two microphone arrays in known positions, where apparatus and methods are described which provide spatially plausible binaural (and other spatial output format) audio rendering for listening positions outside the area spanned by the microphone arrays.

This as described herein can be achieved by:

determining user position with respect to the microphone-array-determined area;

determining directional parameters (spatial metadata) based on the user position and the audio captured with the at least two microphone arrays;

upon determining that the user position is outside of the microphone-array-determined area, determining or selecting microphones (and their associated parameters) corresponding to the user position and directional parameters;

determining a single set of parameters using the parameters associated with the selected microphones;

obtaining modified (directional) parameters by applying a spatial modification rule to the (directional) parameters to modify the value of at least one parameter by at least one amount. The amount can depend on the locations of the determined positions in relation to the microphone-array determined area (e.g., modify more directional parameters corresponding to locations outside the microphone-array determined area); and rendering spatial audio signals (e.g., binaural audio signals) based the modified directional parameters and microphone-array audio signal(s).

The term spatially plausible binaural audio rendering can be understood as (at listening positions outside the area spanned by the microphone arrays) the sound sources inside the area are rendered as 'point-like' from roughly the correct directions, and thus they can be used to navigate towards the area. Since it is assumed that the positions of the sources are unknown, the sound sources outside the area are rendered in such a way as to not conflict with the spatial cues from sources inside the area, avoiding confusion and aiding navigation. Additionally, a certain distance is assumed for those exterior sources, which helps in making their rendering geometrically more consistent and believable as the listener moves, instead of having an unnatural fixed direction.

In some embodiments, the degree of modification of the at least one parameter is larger when the parameters correspond to a sound source outside of the microphone-array-determined area than when they correspond to a sound source inside of the microphone-array-determined area In some embodiments, the determination of whether directional parameters correspond to a sound source outside or inside of the microphone-array-determined area is implemented by comparing whether a direction parameter associated with the directional parameters is closer to a first direction parameter away from the microphone-array-determined-area or a second direction parameter towards the microphone-array-determined area.

Figure 3:
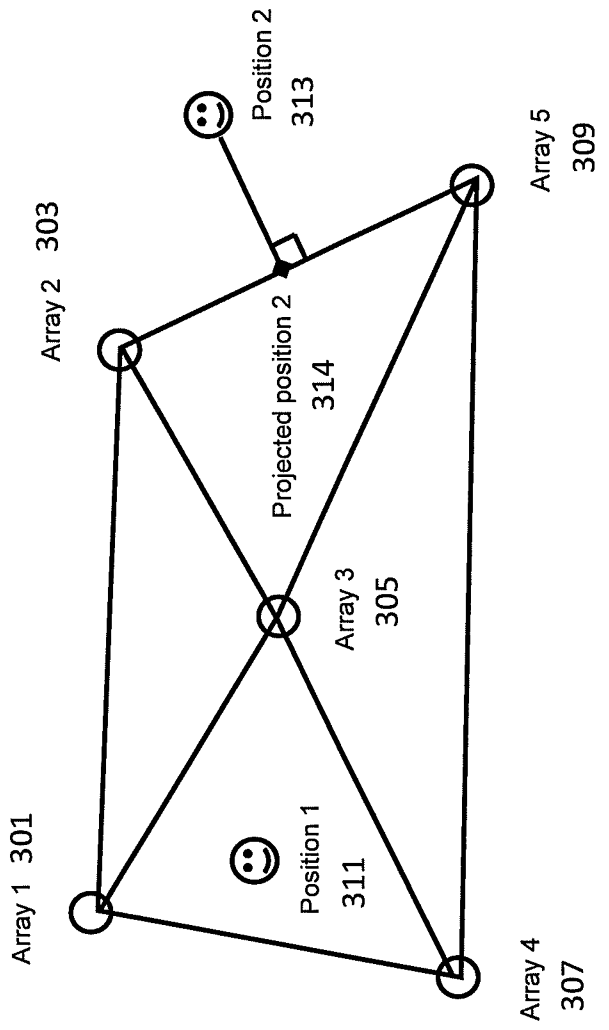
FIG. 3 shows schematically an example planar microphone array arrangement where a user can move within and outside of an area determined by the microphone-arrays.

For example FIG. 3 shows a microphone arrangement where the microphone arrays (shown as circles Array 1 301, Array 2 303, Array 3 305, Array 4 307 and Array 5 309) are positioned on a plane. The spatial metadata has been determined at the array positions. The arrangement has five microphone arrays on a plane. The plane may be divided into interpolation triangles, for example, by Delaunay triangulation. When a user moves to a position within a triangle (for example position 1 311, then the three microphone arrays that form a triangle containing the position are selected for interpolation (Array 1 301, Array 3 305 and Array 4 307 in this example situation). When the user moves outside of the area spanned by the microphone arrays (for example position 2 313), the user position can be projected to the nearest position at the area spanned by the microphone arrays (for example projected position 2 314), and an array-triangle selected for interpolation where the projected position resides (in this example with respect to position 2 and projected position 2, these microphone-arrays are Array 2 303, Array 3 305, and Array 5 309).

Figure 4:
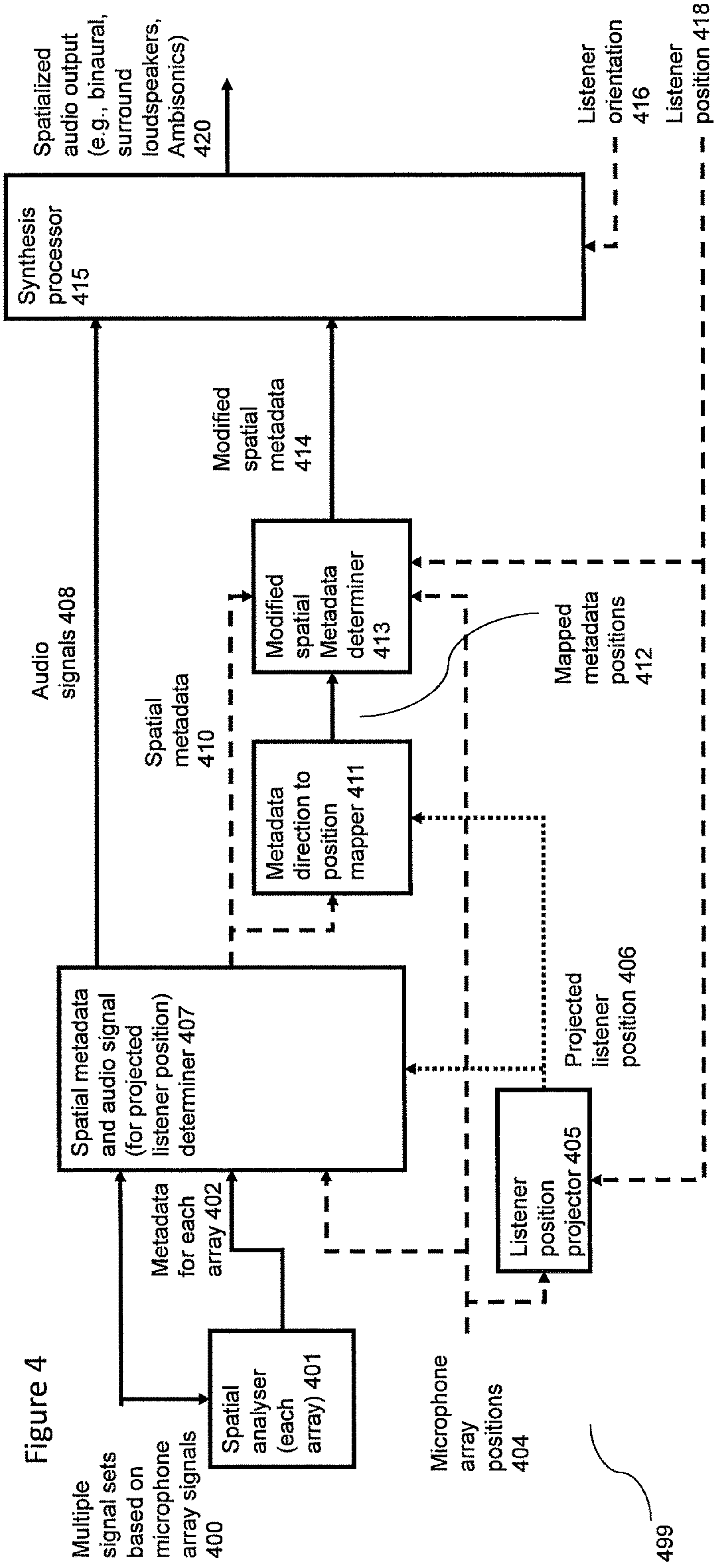
FIG. 4 shows schematically apparatus suitable for rendering audio signals for users able to move within and outside of an area determined by the microphone-arrays according to some embodiments.

With respect to FIG. 4 is shown an example apparatus suitable for implementing some embodiments as described herein.

In this example the input to the system is a multiple signal sets based on microphone array signals 400. These multiple signal sets can for example be multiple Higher Order Ambisonics (HOA) signal sets. The multiple signal sets based on microphone array signals may in some embodiments comprise J sets of multi-channel signals. The signals may be microphone-array signals themselves, or the array signals in some converted form, such as Ambisonic signals. These signals can be denoted as $s_j(m, i)$, where j is the index of the microphone array from which the signals originated (i.e., the signal set index), m is the time in samples, and i is the channel index of the signal set.

Additionally further inputs to the system can comprise microphone array positions 404. The microphone array positions (for each array j) 404 may be defined as position column vectors $p_{j,arr}$ which may be 3×1 vectors containing the x,y,z cartesian coordinates in metres. In the following examples are shown only 2×1 column vectors containing the x,y coordinates, where the elevation (z-axis) of sources, microphones and the listener is assumed to be the same. Nevertheless, the methods described herein may be straightforwardly extended to include also the z-axis. Further inputs are a Listener position 418, and a Listener orientation 416.

The example shown in FIG. 4 shows a spatial analyser 401 which is configured to receive the multiple signal sets based on microphone array signals 400 where (spatial) metadata for each array is determined. These spatial/parametric audio parameters can be determined based on any known mechanism for example such as described in GB2002710.8. The method of determining the spatial metadata can be similar to the method implemented in Directional Audio Coding (DirAC). DirAC can employ a method that provides, based on first-order capture signals, in frequency bands a direction value and a ratio value indicating how directional or non-directional the sound is. This is also an example set of spatial metadata that is derived for each array. The spatial analyser 401 is then configured to output the generated metadata (for each array) 402 to a spatial metadata and audio signal for projected listener position determiner 407. The projected listener position can also be known as a second listener position.

The second listener position in the examples shown herein can be located on the boundary of one of the 'inside' regions, in other words on an edge of a plane defined by two of the (closest) audio signal set positions (or on a surface of a volume at least partially defined by the positions of the two of the audio signal sets) where the signal sets are shown in the following examples as the capture microphone array positions). However in some embodiments the second listener position (or projected listener position) can be a position in an 'outside' region but is located closer to the 'inside' region than the determined listener positon. Furthermore as described later the second listener position can be located within an 'inside' region (which may still be outside a different 'inside' region. Furthermore modified metadata for these positions outside the 'inside' region can be determined in a manner similar to those defined below. For example the modified metadata from the edge or surface border (or some other point in the inside region) may be employed for the second listener position located slightly outside the 'inside' region.

In some embodiments the spatial analyser 401 can comprise a suitable time-frequency transformer configured to receive the multiple signal sets based on microphone array signals 400. The time-frequency transformer is configured to convert the input signals $s_j(m, i)$ to time-frequency domain, e.g., using short-time Fourier transform (STFT) or complex-modulated quadrature mirror filter (QMF) bank. As an example, the STFT is a procedure that is typically configured so that for a frame length of N samples, the current and the previous frame are windowed and processed with a fast Fourier transform (FFT). The result is the time-frequency domain signals which are denoted as $S_j(b,n, i)$, where b is the frequency bin and n is the temporal frame index. The time-frequency microphone-array audio signals can then be output to various estimators.

The spatial analysis can be based on any suitable technique and there are already known suitable methods for a variety of input types. For example, if the input signals are in an Ambisonic or Ambisonic-related form (e.g., they originate from B-format microphones), or the arrays are such that can be in a reasonable way converted to an Ambisonic form (e.g., Eigenmike), then Directional Audio Coding (DirAC) analysis can be performed. First order DirAC has been described in Pulkki, Ville. "Spatial sound reproduction with directional audio coding." Journal of the Audio Engineering Society 55, no. 6 (2007): 503-516, in which a method is specified to estimate from a B-format signal (a variant of a first-order Ambisonics) a set of spatial metadata consisting of direction and ambient-to-total energy ratio parameters in frequency bands.

When higher orders of Ambisonics are available, then Archontis Politis, Juha Vilkamo, and Ville Pulkki. "Sector-based parametric sound field reproduction in the spherical harmonic domain." IEEE Journal of Selected Topics in Signal Processing 9, no. 5 (2015): 852-866 provides methods for obtaining multiple simultaneous direction parameters. Further methods which may be implemented in some embodiments include estimating the spatial metadata from flat devices such as mobile phones and tablets as described in PCT published patent application WO2018/091776, and a similar delay-based analysis method for non-flat devices GB published patent application GB2572368.

In other words, there are various methods to obtain spatial metadata and a selected method may depend on the array type and/or audio signal format. In some embodiments, one method is applied at one frequency range, and another method at another frequency range.

In some embodiments the apparatus comprises a listener position projector 405. The listener position projector 405 is configured to receive the microphone array positions 404 and the listener position 418 and determine a projected listener position 406. The projected listener position 406 is passed to the spatial metadata and audio signal for projected listener position determiner 407.

As it is known in the prior art, the key aim in parametric spatial audio capture and rendering is to obtain a perceptually accurate spatial audio reproduction for the listener. Thus the listener position projector 405 is configured to be able to determine for any position (as the listener may move to arbitrary positions), a projected position or interpolation data to allow the modification of metadata based on the microphone array positions 404 and the listener position 418.

In the example here the microphone arrays are located on a plane. In other words, the arrays have no z-axis displacement component. However extending the embodiments to the z-axis can be implemented in some embodiments, as well as to situations where the microphone arrays are located on a line (in other words there is only one axis displacement).

The listener position projector 405 can for example in some embodiments determine a projected listener position vector $p_L$ (a 2-by-1 vector in this example containing the x and y coordinates);

The spatial metadata and audio signal for projected listener position determiner 407 is thus configured to obtain the Multiple signal sets based on microphone array signals 400, Metadata for each array 402, Microphone array positions 404, and Projected listener position 406. The spatial metadata and audio signal for projected listener position determiner 407 is configured to determine spatial metadata and audio signals corresponding the projected listener position.

This determination of the spatial metadata and audio signals corresponding the projected listener position block can be implemented in a manner similar to that described in GB2002710.8.

For example the spatial metadata and audio signal for projected listener position determiner 407 can be configured to formulate interpolation weights $w_1$, $w_2$, $w_3$. These weights can be formulated for example using the following known conversion between barycentric and Cartesian coordinates. First a 3×3 matrix is determined based on the microphone array position vectors $p_{j_x}$ by appending each vector with a unity value and combining the resulting vectors to a matrix $$P_{j_1,j_2,j_3} = \begin{bmatrix} p_{j_1} & p_{j_2} & p_{j_3} \\ 1 & 1 & 1 \end{bmatrix}$$

The microphone array position vectors $p_{j_1}$, $p_{j_2}$, and $p_{j_3}$ are corresponding to the microphone arrays $j_1$, $j_2$, and $j_3$ that form a triangle inside which the projected listener position is.

Then, the weights are formulated using a matrix inverse and a 3×1 vector that is obtained by appending the (projected) listener position vector $p_L$ with unity value $$\begin{bmatrix} w_1 \\ w_2 \\ w_3 \end{bmatrix} = P_{j_1,j_2,j_3}^{-1} \begin{bmatrix} p_L \\ 1 \end{bmatrix}$$

The interpolation weights ($w_1$, $w_2$, and $w_3$), position vectors ($p_L$, $p_{j_1}$, $p_{j_2}$, and $p_{j_3}$), and the microphone arrangement indices ($j_1$, $j_2$, and $j_3$) together can then be used to determine the spatial metadata and audio signal for projected listener position.

The determined spatial metadata for the projected listener position can be an interpolation of the metadata using the interpolation weights $w_1$, $w_2$, $w_3$. In some embodiments this may be implemented by firstly converting the spatial metadata of azimuth $\theta_j(k,n)$, elevation $\varphi_j(k,n)$ and direct-to-total energy ratio $r_j(k,n)$, for frequency band k and time index n, to a vector form:

$$v_j(k,n) = \begin{bmatrix} \cos(\theta_j(k,n))\cos(\varphi_j(k,n)) \\ \sin(\theta_j(k,n))\cos(\varphi_j(k,n)) \\ \sin(\varphi_j(k,n)) \end{bmatrix} r_j(k,n)$$

Then, these vectors are averaged by $$v(k,n)=w_1 v_{j_1}(k,n)+w_2 v_{j_2}(k,n)+w_3 v_{j_3}(k,n)$$

Then, denoting $$v(k,n)=[v_1(k,n)\ v_2(k,n)\ v_3(k,n)]^T,$$

the interpolated metadata is obtained by $$\theta(k,n)=\text{atan }2(v_2(k,n),\ v_1(k,n))$$

$$\varphi(k,n)=\text{atan }2(v_3(k,n),\ \sqrt{v_1^2(k,n)+v_2^2(k,n)})$$

$$r(k,n)=\sqrt{v_1^2(k,n)+v_2^2(k,n)+v_3^2(k,n)}$$

The interpolated spatial metadata 410 is then output to a metadata direction to position mapper 411 and modified spatial metadata determiner 413.

In the above, one example of metadata interpolation was presented. Other interpolation rules may be also designed and implemented in other embodiments. For example, the interpolated ratio parameter may be also determined as a weighted average (according to $w_i$, $w_2$, $w_3$) of input ratios. Furthermore, in some embodiments, the averaging may also involve weighting according to the energy of the array signals.

The determined audio signal for the projected listener position can be an interpolation of the input audio signals 400. Thus the multiple signal sets audio signals (or time-frequency domain converted versions of them) can be used to determine an overall energy for each audio signal and for each band. In an example where the multiple signal sets based on the microphone array signals 400 are in a form of FOA signals the overall energy can be determined as the energy of the omnidirectional, i.e., the first channel of the FOA signals $$E_j(k,n) = \sum_{b=b_{k,low}}^{b_{k,high}} |S_j(b,n,1)|^2$$

where $b_{k,low}$ is the first bin of the band k and the $b_{k,high}$ the last bin.

The spatial metadata and audio signal for projected listener position determiner 407 may then be configured to determine for indices $j_1$, $j_2$, $j_3$ the distance values $d_{j_x}=|p_L-p_{j_x}|$, and the index with the smallest distance denoted as $j_{minD}$.

Then, the spatial metadata and audio signal for projected listener position determiner 407 is configured to determine the selected index $j_{sel}$. For the first frame (or, when the processing begins), the spatial metadata and audio signal for projected listener position determiner 407 may set $j_{sel}=j_{minD}$.

For the next or succeeding frames (or any desired temporal resolution), when the user position has potentially changed, the spatial metadata and audio signal for projected listener position determiner 407 is configured to resolve whether the selection $j_{sel}$ needs to be changed. The changing is needed if $j_{sel}$ is not contained by $j_1$, $j_2$, $j_3$. This condition means that the user has moved to another region which does not contain $j_{sel}$. The changing is also needed if $d_{j_{sel}}>d_{j_{minD}}\alpha$, where $\alpha$ is a threshold value. For example, $\alpha$=1.2. This condition means that the user has moved significantly closer to the array position of $j_{minD}$ when compared to array position of $j_{sel}$. The threshold is needed so that the selection does not erratically change back and forth when the user is in the middle of the two positions (in other words to provide a hysteresis threshold to prevent rapid switching between arrays).

If either of the above conditions is met, then $j_{sel}=j_{minD}$. Otherwise, the previous value of $j_{sel}$ is kept.

The intermediate interpolated signal is determined as $$S'_{interp}(b,n,i)=S_{j_{sel}}(b,n,i)$$

With such processing, when $j_{sel}$ changes, it follows that the selection is changed for all frequency bands at the same time. In some embodiments, the selection is set to change in a frequency-dependent manner. For example, when $j_{sel}$ changes, then some of the frequency bands are updated immediately, whereas some other bands are changed at the next frames until all bands are changed. Changing the signal in such a frequency-dependent manner may be needed to reduce potential switching artefacts at signal $S'_{interp}(b,n,i)$. In such a configuration, when the switching is taking place, it is possible that for a short transition period, some frequencies of signal $S'_{interp}(b,n,i)$ are from one microphone array, while the other frequencies are from another microphone array.

Then, the spatial metadata and audio signal for projected listener position determiner 407 is configured to determine an intermediate signal $S'_{interp}(b,n,i)$ which is energy corrected. An equalization gain is formulated in frequency bands $$g(k,n) = \min\left(g_{max}, \sqrt{\frac{E_{j_1}(k,n)w_1 + E_{j_2}(k,n)w_2 + E_{j_3}(k,n)w_3}{E_{j_{sel}}(k,n)}}\right)$$

The $g_{max}$ value limits excessive amplification, for example, $g_{max}$=4. Then the equalization is performed by multiplication $$S(b,n,i)=g(k,n)S'_{interp}(b,n,i)$$

where k is the band index where bin b resides. The spatial metadata and audio signal for projected listener position determiner 407 is then configured to output the signal S(b,n,i) as the audio signals 408 to the synthesis processor 415.

In this example embodiment, the (projected position) spatial metadata 410 contains direction (azimuth θ(k,n) and elevation ϕ(k,n)) and direct-to-total energy ratio r(k,n) parameters in time-frequency domain (k is the frequency band index and n the temporal frame index). In other embodiments, other parameters can be used additionally or instead.

In some embodiments the apparatus 499 comprises a metadata direction to position mapper 411. The metadata direction to position mapper 411 is configured to receive the spatial metadata 410 from the spatial metadata and audio signal for projected listener position determiner 407, the projected listener position 406 and map the directions [θ(k, n), ϕ(k,n)] on spatial positions within a cartesian coordinate system x(k,n), y(k,n), and z(k,n), in this example, on a surface of a shape. The shape can be any suitable shape, and it can be fixed or adaptive. The mapped position in the cartesian coordinates is the position where a line from the projected listener position towards the directions [θ(k,n), ϕ(k,n)] intersects the determined shape. In other words, the shape in this example is determined by a distance parameter d(θ(k,n), ϕ(k,n)). The projected listener position 406 at temporal index n is denoted $x_P(n)$, $y_P(n)$, $z_P(n)$ and the mapping is performed by $$x(k,n)=\cos(\theta(k,n))\cos(\phi(k,n))d(\theta(k,n),\phi(k,n))+x_P(n)$$

$$y(k,n)=\sin(\theta(k,n))\cos(\phi(k,n))d(\theta(k,n),\phi(k,n))+y_P(n)$$

$$z(k,n)=\sin(\phi(k,n))d(\theta(k,n),\phi(k,n))+z_P(n)$$

In some embodiments the shape at different directions, i.e., the distance d(θ(k,n),ϕ(k,n)) would be such that reflects the distances of the sound sources at the corresponding directions from the projected position. For example, multi-array source localization techniques or visual analysis methods could be employed to determine the general areas where the sources reside, and an approximate function for d(θ(k, n),ϕ(k,n)) could be determined accordingly.

If that information is not available or cannot be reliably estimated, it can also be set to a predefined fixed distance value, or it can use geometry information to define a potential source distance at different directions. For example, in the simplest case a sphere with a certain radius in metres (e.g., 2 metres) can be set globally. Alternatively, if there is a room boundary around the array, or certain known boundaries (e.g. walls) at different directions, the distance from the array edges to those boundaries can serve as assumed maximum source distances.

Thus, the directions [θ(k,n), ϕ(k,n)] are mapped to Mapped metadata positions 412 x(k,n), y(k,n), and z(k,n), which are output and can then be passed to the modified spatial metadata determiner 413.

In some embodiments the apparatus 499 comprises a modified spatial metadata determiner 413. The modified spatial metadata determiner 413 is configured to receive the Mapped metadata positions 412, the Spatial metadata 410, the Listener position 418, and Microphone array positions 404 which is configured to determine suitable metadata for the actual listener position, whereas the original Spatial metadata 410 was determined for the Projected listener position 406. In other words the modified spatial metadata determiner 413 is configured to determine modified directions [$\theta_{mod}$(k,n), $\phi_{mod}$(k,n)] and modified direct-to-total energy ratios $r_{mod}$(k,n). In case the projected listener position 406 is the same as the listener position 408, i.e., when the user is within the area determined by the microphone arrays, then the modified directions and ratios can be the same as those of the original spatial metadata 410. Otherwise the following procedures may be applied.

The modified spatial metadata determiner 413 can thus in some embodiments first convert the Mapped locations (the mapped metadata positions 412) to directions [($\theta$'(k,n), $\phi$'(k,n)] based on the Listener position 418. Denoting $x_L$(n), $y_L$(n), $z_L$(n) as the listener position, these directions can be determined by $$\theta'(k,n)=\text{atan }2((y(k,n)-y_L(n)),(x(k,n)-x_L(n)))$$

$$\phi'(k,n)=\text{atan }2((z(k,n)-z_L(n)),\sqrt{(x(k,n)-x_L(n))^2+(y(k,n)-y_L(n))^2})$$

In some embodiments it is possible to use these directions directly as the modified directions (i.e., $\theta_{mod}$(k,n)=$\theta$'(k,n) and $\phi_{mod}$(k,n)=$\phi$'(k,n)). Alternatively, in some embodiments the modified spatial metadata determiner 413 is configured to (adaptively) interpolate between the original [$\theta$(k,n), $\phi$(k,n)] and mapped directions [$\theta$'(k,n), $\phi$'(k,n)]. For example, for directions pointing "inside" the area spanned by the microphone arrays the original directions can be used, and for directions pointing "outside", the mapped directions can be used.

The modified directions [$\theta_{mod}$(k,n), $\phi_{mod}$(k,n)] are fair estimates for the possible directions at the Listener position. Nevertheless, it should be noted that these estimates are "plausible estimates" only, and they are not necessarily accurate estimates (e.g., if the directions are just mapped on the surface of a sphere with a fixed distance).

In some embodiments, the modified spatial metadata determiner 413, is thus configured to modify the direct-to-total energy ratios in such a way that they are modified to be smaller the larger the uncertainty. This modification mitigates the effect of uncertain directions as they are rendered at least partly as diffuse, while the more certain directions are rendered normally.

The modification of the direct-to-total energy ratios can be implemented in any suitable manner. For example, the distance between the mapped locations (the mapped metadata positions 412) x(k,n), y(k,n), and z(k,n) and the Listener position 418 can be determined, and the closer the listener is to the Mapped location, the more the direct-to-total energy ratio r(k,n) is decreased for that time-frequency tile. For example, the decreasing operation may be according to the function $$r_{mod}(k,n)=\min(r(k,n),\ \frac{d_1(k,n)}{d_2(k,n)})$$

where $$d_1(n)=\sqrt{(x(k,n)-x_L(n))^2+(y(k,n)-y_L(n))^2+(z(k,n)-z_L(n))^2}$$

$$d_2(n)=\sqrt{(x_P(n)-x_L(n))^2+(y_P(n)-y_L(n))^2+(z_P(n)-z_L(n))^2}$$

In some embodiments, the modified spatial metadata determiner 413 is configured to not modify the direct-to-total energy ratios r(k,n) corresponding to the directions pointing "inside" the area spanned by the microphone arrays.

The modification of the direct-to-total energy ratio can have the following effects.

Firstly, the sound sources outside the area, for which there is no accurate information on the actual directions, are made less "directional", when the listener approaches the assumed locations. Thus, the listener does not get false assumption of a sound source being in some exact position, which could be wrong.

Secondly, the sound sources inside the area are kept point-like. For these sources the directions are fairly accurate, and thus it is preferable for quality reasons to render them as point-like sources. This helps the listener to navigate in the sound scene, and it keeps the rendered audio scene more natural, as only part of the sound sources is made non-directional (when outside the area).

Thirdly, if the listener moves very far away from the area, all sound sources are made directional again (the sound sources inside and outside the area). The reason for this is that it can be assumed that the sound sources captured by the microphone arrays are probably not very far away from the microphone arrays.

Additionally the synthesis processor 415 is configured to receive the Audio signals 408, Modified spatial metadata 414 and listener orientation 416. The synthesis processor 415 is configured to perform spatial rendering of the audio signals 408 to generate a Spatialized audio output 420. The spatialized audio output 420 can be in any suitable format, for example binaural, surround loudspeakers, Ambisonics.

The spatial processing can be any suitable synthesis processing. For example a suitable spatial processing is described in GB2002710.8.

Thus for example the synthesis processor can be configured to determine a vector rotation function to be used in the following formulation. According to the principles in Laitinen, M.V., 2008. Binaural reproduction for directional audio coding. Master's thesis, Helsinki University of Technology, pages 54-55, it is possible to define a rotate function as $$\begin{bmatrix} x' \\ y' \\ z' \end{bmatrix} = \text{rotate}\left(\begin{bmatrix} x \\ y \\ z \end{bmatrix}, \text{yaw,pitch,roll}\right)$$

where yaw, pitch and roll are the head orientation parameters and x,y,z are the values of a unit vector that is being rotated. The result is x',y',z', which is the rotated unit vector. The mapping function performs the following steps:

1. Yaw rotation $$x_1=\cos(\text{yaw})x+\sin(\text{yaw})y$$

$$y_1=-\sin(\text{yaw})x+\cos(\text{yaw})y$$

$$z_1=z$$

2. Pitch rotation $$x_2 = \cos(-\text{pitch} + \text{atan2}(z_1, x_1))\sqrt{1 - y_1^2}$$
$$y_2 = y_1$$
$$z_2 = \cos\left(-\frac{\pi}{2} - \text{pitch} + \text{atan2}(z_1, x_1)\right)\sqrt{1 - y_1^2}$$

3. And finally, roll rotation $$x' = x_2$$
$$y' = \cos(\text{roll} + \text{atan2}(z_2, y_2))\sqrt{1 - x_2^2}$$
$$z' = \cos\left(-\frac{\pi}{2} + \text{roll} + \text{atan2}(z_2, y_2)\right)\sqrt{1 - x_2^2}$$

The synthesis processor 415 may implement, having determined these parameters, any suitable spatial rendering. For example in some embodiments the synthesis processor 415 may implement a 3 DOF rendering, for example, according to the principles described in PCT publication WO2019086757. Note that the '3 DOF rendering' effectively means 6 DOF rendering because the positional processing has already been accounted for in the audio signals 408 and modified spatial metadata 414, and the synthesis processor only needs to account for the head rotation (remaining 3 degrees of the 6 degrees of freedom).

In other words the Synthesis processor 415 operations can be summarised by

1) Convert "Audio signals" into a time-frequency representation (unless already so) using any known filter bank suitable for audio processing, 2) Process in frequency bands the time-frequency audio signals based on the spatial metadata, and 3) Convert the processed audio back to the time domain signals, to obtain the Spatial audio output 420.

In some embodiments the Synthesis processor 415 is configured, if rendering a binaural output signal, to first rotate the direction parameters [$\theta_{mod}$(k,n), $\phi_{mod}$(k,n)] according to the head orientation. This is achieved by converting the directions to a unit vector $[x\ y\ z]^T$ pointing towards the corresponding direction, using the function rotate($[x\ y\ z]^T$, yaw,pitch,roll) to obtain rotated unit vector $[x'\ y'\ z']^T$, and then converting the unit vector to rotated azimuth and elevation parameters [$\theta_{modR}$(k,n), $\phi_{modR}$(k,n)]. Then the Synthesis processor 415 is configured to employ head-related transfer functions (HRTFs) in frequency bands to steer a direct energetic proportion $r_{mod}$(k,n) of the audio signals to the direction of [$\theta_{modR}$(k,n), $\phi_{modR}$(k,n)] and ambient energetic proportion 1−$r_{mod}$(k,n) of the audio signals as spatially unlocalizable sound using decorrelators configured to provide appropriate diffuse field binaural inter-aural correlation. The processing is adapted for each frequency and time interval (k,n) as determined by the spatial metadata. Similarly, for a loudspeaker output, the direct portion can be rendered using a panning function for the target loudspeaker layout and ambience to be incoherent between the loudspeakers. In loudspeaker playback the metadata rotation is not needed, because it is accounted for at the listening time as the sound is reproduced from the loudspeakers. Similarly, for an Ambisonic output, the panning function can be an Ambisonic panning function, and the ambience can be also incoherent between the output channels, however with levels according to the used Ambisonic normalization scheme. In Ambisonic rendering the rotation is typically not needed, because the head orientation is assumed to be accounted for at an Ambisonic renderer, if the Ambisonic sound is eventually rendered to a binaural output.

Figure 5:
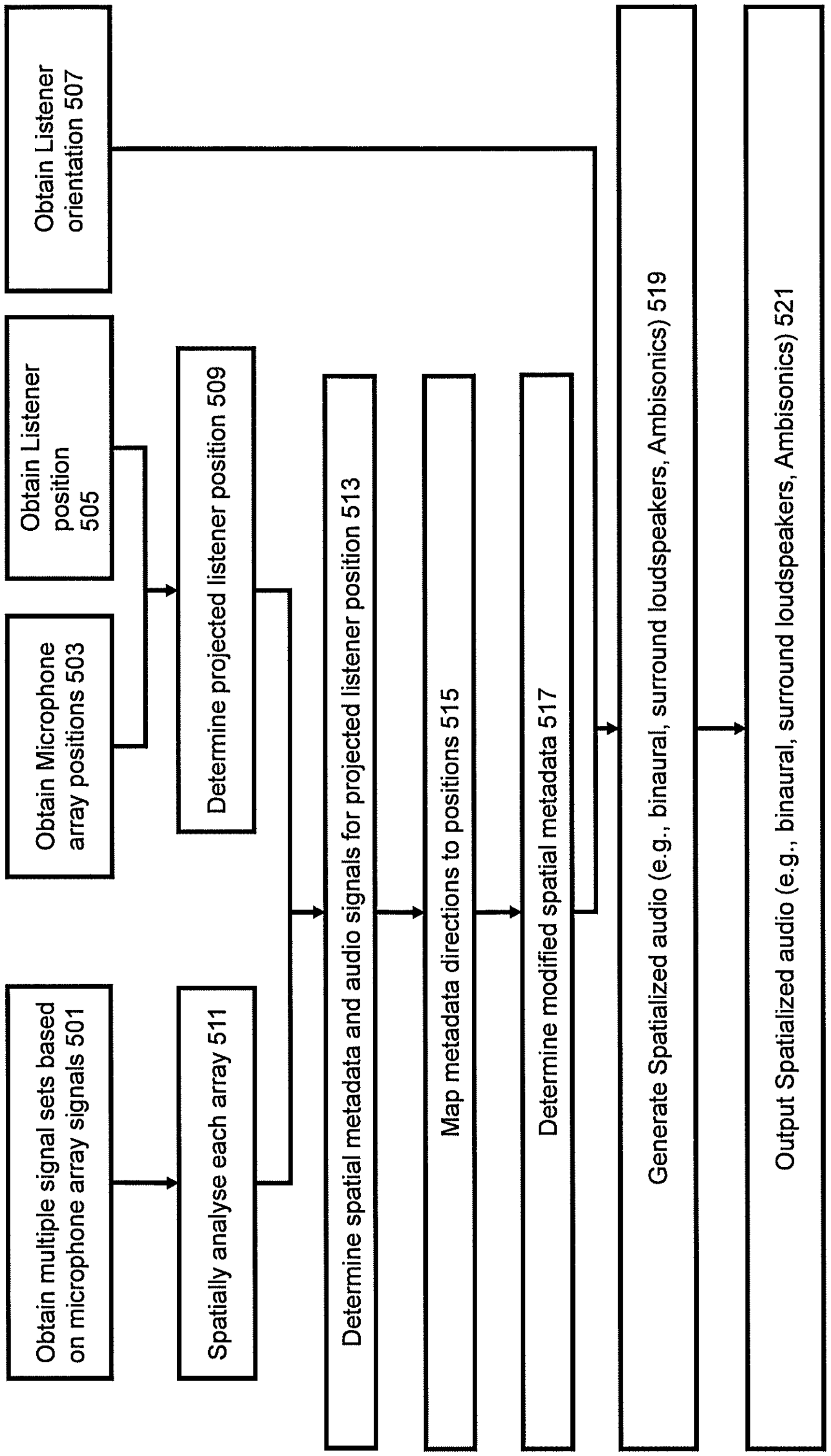
FIG. 5 shows a flow diagram of the operations of the apparatus shown in FIG. 4 according to some embodiments.

With respect to FIG. 5 is shown a flow diagram of the example apparatus as shown in FIG. 4.

The obtaining of multiple signal sets based on microphone-array audio signals is shown in FIG. 5 by step 501.

The spatial analysis of the multiple signal sets to determine metadata for each microphone-array is shown in FIG. 5 by step 511.

The obtaining of microphone array positions is shown in FIG. 5 by step 503.

Additionally the obtaining of listener position is shown in FIG. 5 by step 507.

Having obtained the listener position and microphone-array positions the determination of the projected listener position is shown in FIG. 5 by step 509.

Then having obtained the projected listener position and the spatial metadata (and already having obtained the microphone array positions) then there is a determination of the spatial metadata and audio signals for the projected listener position as shown in FIG. 5 by step 513.

Then having determined spatial metadata for the projected listener position there is a mapping of the metadata directions to positions as shown in FIG. 5 by step 515.

Furthermore having determined the mapped positions then there is determination of modified spatial metadata as shown in FIG. 5 by step 517.

Having obtained the listener orientation and the modified spatial metadata (and also the audio signals) then a generation of a spatialized audio signal (e.g. binaural, surround loudspeakers, Ambisonics) is performed as shown in FIG. 5 by step 519.

Then the spatialized audio signal is output (to the output device—such as headphones) as shown in FIG. 5 by step 521.

In some embodiments it may be possible to render the ambient parts based on how far away the listener is from the area spanned by the microphone arrays. For example, when the listener is near the area (or inside the area), the target directional distribution for the ambience rendering may follow the directional distribution of the audio signals captured by the closest microphone arrays, whereas, when the listener is far away from the area, the target directional distribution may be more omnidirectional. This may be useful in order to avoid false directional perception of ambience when the listener is far away from the microphone arrays.

In some embodiments the direct and ambient parts are not rendered separately as above, as an improved quality of the processing can be obtained with a mixing technique that renders the direct and ambient portions in the same processing step. The benefit is to minimize the need of decorrelators that may be detrimental to the perceived audio quality. Such optimized audio processing procedures are further detailed in GB2002710.8.

In the example embodiment described earlier above, the listener position requires spatial parameters determined from the outer microphones forming the microphone-array arrangement. If the listener position can be projected to an outer edge of the array (edge rendering), then the parameters are interpolated from the two microphones forming the edge, similar to GB2002710.8 when the listener position is on the edge. In such embodiments it is possible to enable a smooth transition from the interior rendering approach of GB2002710.8 to the exterior rendering as described in the embodiments herein when the listener crosses the boundary through an edge. The valid edge can be found by projecting the listener to the closest edges and determining if the projection point is on the edge or outside of it. One way to determine the closest edges is maintaining a list of exterior edges, and based on the closest microphone find the two edges connected to it.

Figure 6:
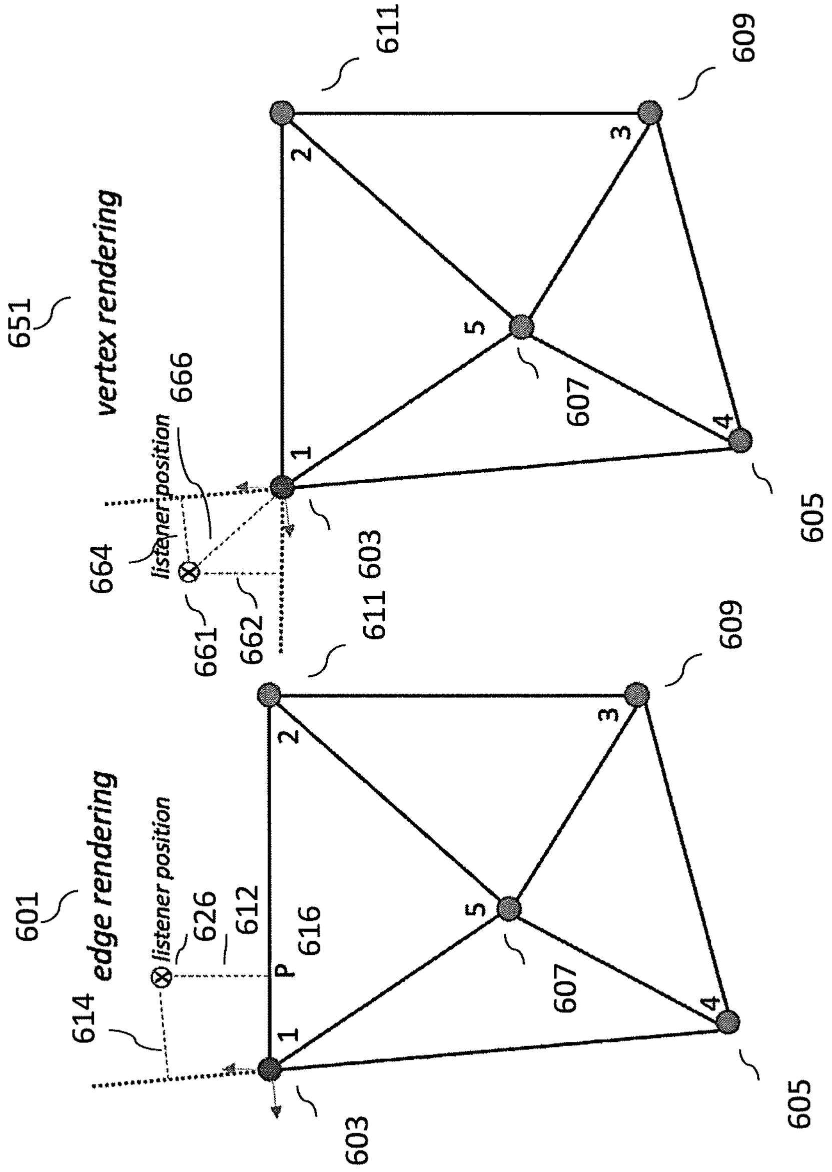
FIG. 6 shows schematically listener positions for example edge and vertex rendering scenarios according to some embodiments.

Thus for example as shown on the edge rendering case 601 of FIG. 6 is shown example microphone-array locations (shown as circles Array 1 603, Array 2 611, Array 3 609, Array 4 605 and Array 5 607). Furthermore the listener at listener position 626 has a first projection 612 from the (vector) line which connects the positions of Array 1 603 and Array 2 611 and which intersects with the line at point P 616 between the positions of Array 1 603 and Array 2 611. There is also a second projection 614 from the (vector) line which connects the positions of Array 1 603 and Array 4 605 but which intersects with the line but outside the positions of Array 1 603 and Array 4 605.

However, when the listener is outside the array there are regions around corners where no projection on an edge segment exists. In this case (vertex rendering), the spatial metadata to be used is directly from the closest microphone forming that corner. This strategy enables a smooth transition from the interior rendering of GB2002710.8 to the exterior rendering as described in the embodiments herein when the listener crosses the boundary through the microphone in the corner.

Thus for example as shown on the vertex rendering case 651 of FIG. 6 is shown the example microphone-array locations (shown as circles Array 1 603, Array 2 611, Array 3 609, Array 4 605 and Array 5 607). Furthermore the listener at listener position 661 has a first projection 662 from the (vector) line which connects the positions of Array 1 603 and Array 2 611 and which intersects with the line outside the positions of Array 1 603 and Array 2 611. There is also a second projection 664 from the (vector) line which connects the positions of Array 1 603 and Array 4 605 but which intersects with the line but outside the positions of Array 1 603 and Array 4 605. A third projection 666 is directly to the closest array-microphone position Array 1 603.

In some embodiments a geometric check can thus be implemented to determine whether edge rendering or vertex rendering is to be applied. The geometric check can be based on determining the two edges adjacent to the closest microphone, and projecting the listener on both of them. If any of the two projections fall inside the edge segment, edge rendering is assumed, while if none of the projections fall inside the edge segments, vertex rendering is assumed.

Figure 7:
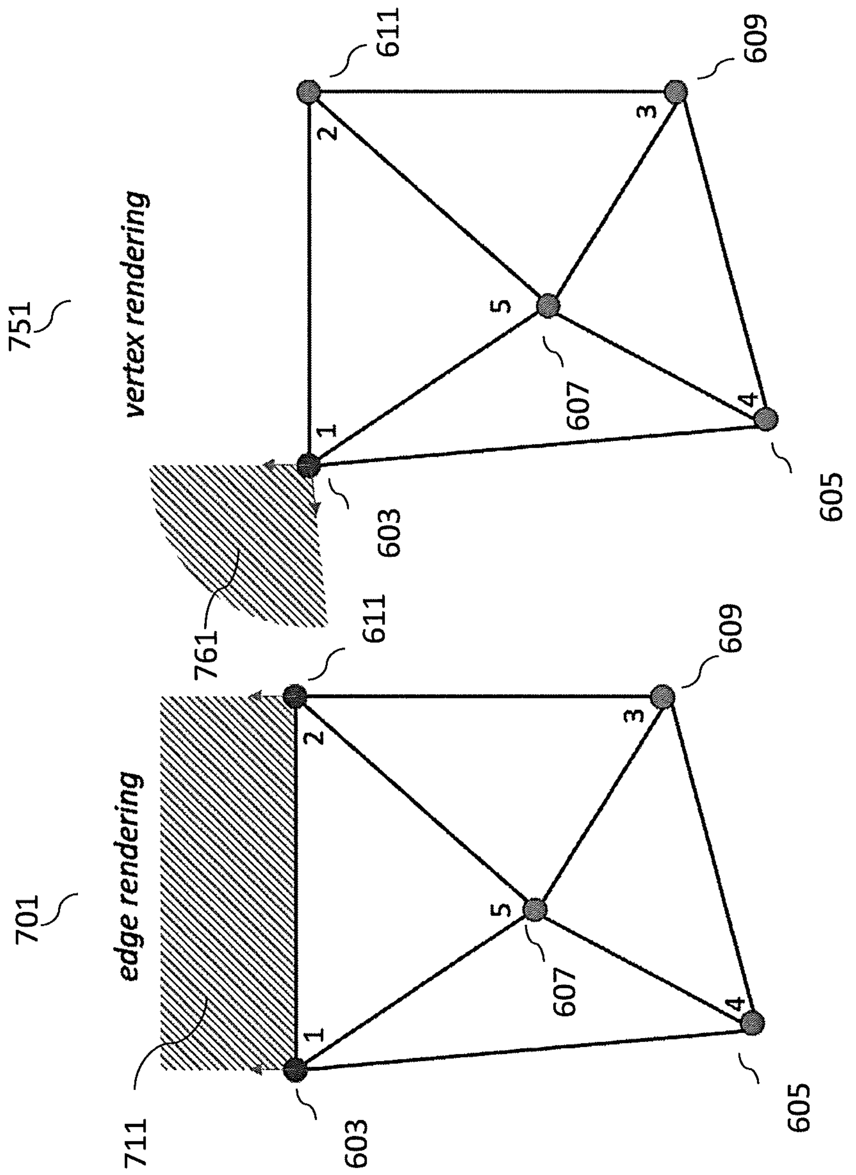
FIG. 7 shows schematically example regions covered by the example edge and vertex rendering scenarios according to some embodiments.

Thus for example as shown on the edge rending case 701 of FIG. 7 is shown example microphone-array locations (shown as circles Array 1 603, Array 2 611, Array 3 609, Array 4 605 and Array 5 607). Furthermore the edge rendering region 711 is shown which is defined by the (vector) line which connects the positions of Array 1 603 and Array 2 611, the (vector) line which connects the positions of Array 1 603 and Array 4 605 and the (vector) line which connects the positions of Array 2 611 and Array 3 609.

Further is shown the vertex rendering case 751 where there is a vertex rendering region 761 defined by the (vector) line which connects the positions of Array 1 603 and Array 2 611 and the (vector) line which connects the positions of Array 1 603 and Array 4 605.

In some embodiments, the spatial parameters can be modified by the Modified spatial metadata determiner 413 according to an angular weighting between the original spatial parameters of the edge or vertex point and the spatial parameters due to the projection. The Modified spatial metadata determiner 413 in such embodiments uses information from the array geometry and the estimated DOAs such that it is possible to modify mostly the parameters that appear to originate from sources at the exterior of the array, while leaving the spatial parameters that originate from the array region mostly unaffected. In this way, exterior sounds become "fuzzier" as the listener moves away from the microphone-array region but sounds emanating from the microphone-array region can preserve their directional sharpness, providing a sonic anchor towards the array as the listener moves to its exterior.

In some embodiments the Modified spatial metadata determiner 413 is configured to determine directional weighting as follows:

vertex normals $\vec{n}_1, \vec{n}_2, \ldots$ pointing outwards are computed for each microphone on the exterior array boundary. Each vertex normal is composed as the mean of the two normals of the two edges connected to that vertex. These normals can then be employed in both vertex and edge rendering modes to indicate a direction that is maximally "outwards" from the array interior. If the listener is on vertex rendering, the normal vector is used from the closest microphone. If the listener is on edge rendering, the normal vector is determined by interpolating the two vertex normals at the ends of the edge, based on the projected listener position.

$$\vec{n}_P = \text{unit}\,\{(1-d_{1P}/d_{12})\vec{n}_1 + d_{1P}/d_{12}\vec{n}_2\}$$

where $d_{AB}$ indicates a distance between points A and B, and unit{ } is a function that normalizes a vector to a unit vector with the same direction.

Figure 8:
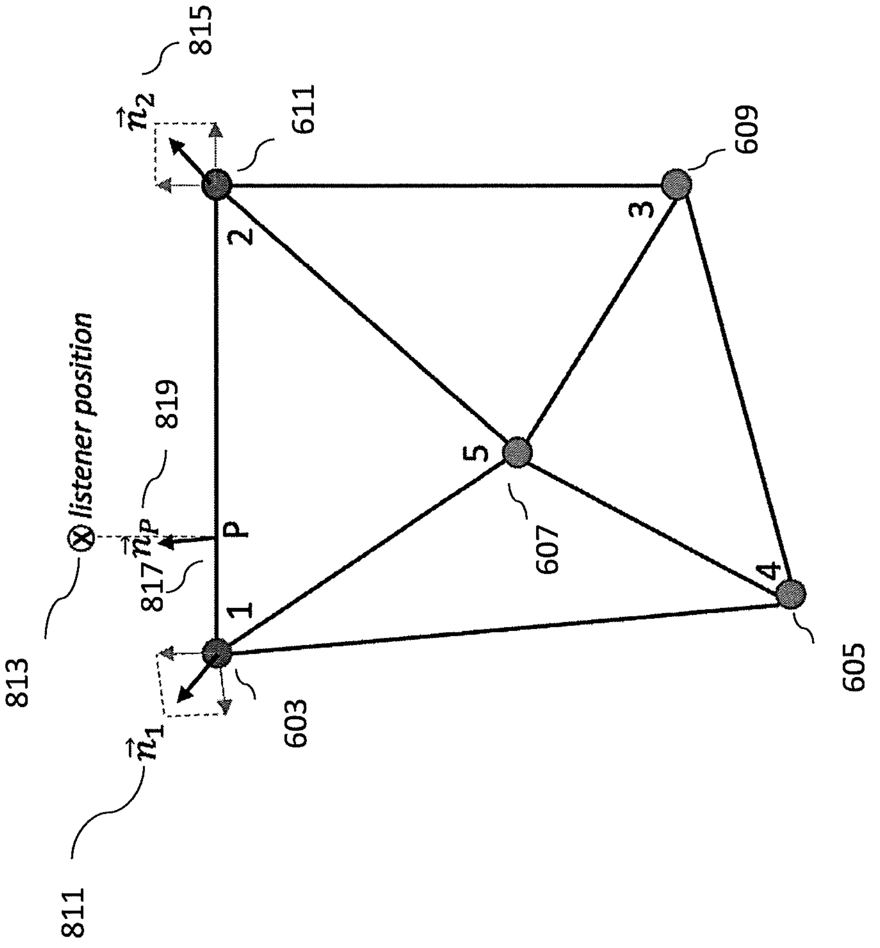
FIG. 8 shows schematically normal vector determination for listener position for example edge rendering according to some embodiments.

Thus for example as shown in FIG. 8 there is shown the example microphone-array locations (shown as circles Array 1 603, Array 2 611, Array 3 609, Array 4 605 and Array 5 607). Furthermore is shown the listener at listener position 813.

There is a first vertex normal $\vec{n}_1$ 811 which is a combination of the (vector) line which connects the positions of Array 1 603 and Array 2 611 and the (vector) line which connects the positions of Array 1 603 and Array 4 605.

There is a second vertex normal $\vec{n}_2$815 which is a combination of the (vector) line which connects the positions of Array 1 603 and Array 2 611 and the (vector) line which connects the positions of Array 2 611 and Array 3 609.

Additionally is shown the edge 'normal' $\vec{n}_P$ 819 which is the combination of the first and second vertex normal from the projection point 817. In this example point P is the projected listener position, then there is an edge normal n_p which is formulated based on n_1 and n_2, as described above. The point P thus varies with the listener position to modulate from one vertex normal to one side of the edge, to the other, as the listener moves along the edge.

Thus in some embodiments a weighting function can be determined based on the analysed DOA $\vec{u}(k,n)$ (for the projected listener position) and the normal:

$$w_1(k,n) = 1/2^N (1 + \vec{u}(k,n) \cdot \vec{n}_P)^N$$

$$w_2(k,n) = 1 - w_1(k,n)$$

where N is a power factor that determines how sharply the directional weighting increases towards the exterior of the array. E.g. for N=1 the weight has a cardioid pattern with its peak at the normal pointing outwards, for N=2 it has a second-order cardioid pattern and so on.

Thus as the listener moves away from the edge or vertex, the mapped DOA is determined as indicated above, using vector notation:

$$\vec{u}_M(k,n)=\text{unit}\{\vec{r}_P(n)+d(k,n))\vec{u}(k,n)-\vec{r}_L(n)\}$$

Here, $\vec{u}_M$ is the mapped DOA, $\vec{r}_L$ the listener position, $\vec{r}_P$ the projected listener position to the vertex or edge, and d the distance to the mapping boundary.

In some embodiments the mapping effect is applied (mostly) to exterior DOAs, hence the directional weighting can be determined as $$\vec{u}_{mod}(k,n)=\text{unit}\{w_1(k,n)\vec{u}_M(k,n)+w_2(k,n)\vec{u}(k,n)\}$$

From the final modified $\vec{u}_{mod}$(k,n) a modified azimuth and elevation $\theta_{mod}$, $\varphi_{mod}$ can be determined from the direction of $\vec{u}_{mod}$(k,n).

Additionally, in some embodiments to increase diffuseness as we move away from the edge, with the maximum effect at distance R can be implemented by decreasing the direct-to-total energy ratio in a manner similar to the method of reducing the direct-to-total enemy ratio as discussed above:

$$r'_{mod}(k,n)=\min\left[r(k,n),\frac{d_1(n)}{d_2(n)}\right]$$

where $d_1(n)=\|\vec{r}_P(n)+d(\vec{u}(k,n))\vec{u}(k,n)-\vec{r}_L(n)\|$ and $d_2(n)=d(\vec{u}(k,n))$ similar to the previous embodiment.

In some embodiments the direct-to-total energy ratio is modified mainly for the exterior DOAs and rendering of interior sources is left mostly unaffected. Hence, in some embodiments a directional weighting can be determined as:

$$r_{mod}(k,n)=\min[w_1(k,n)r'_{mod}(k,n)+w_2(k,n)r(k,n),1]$$

Figure 9:
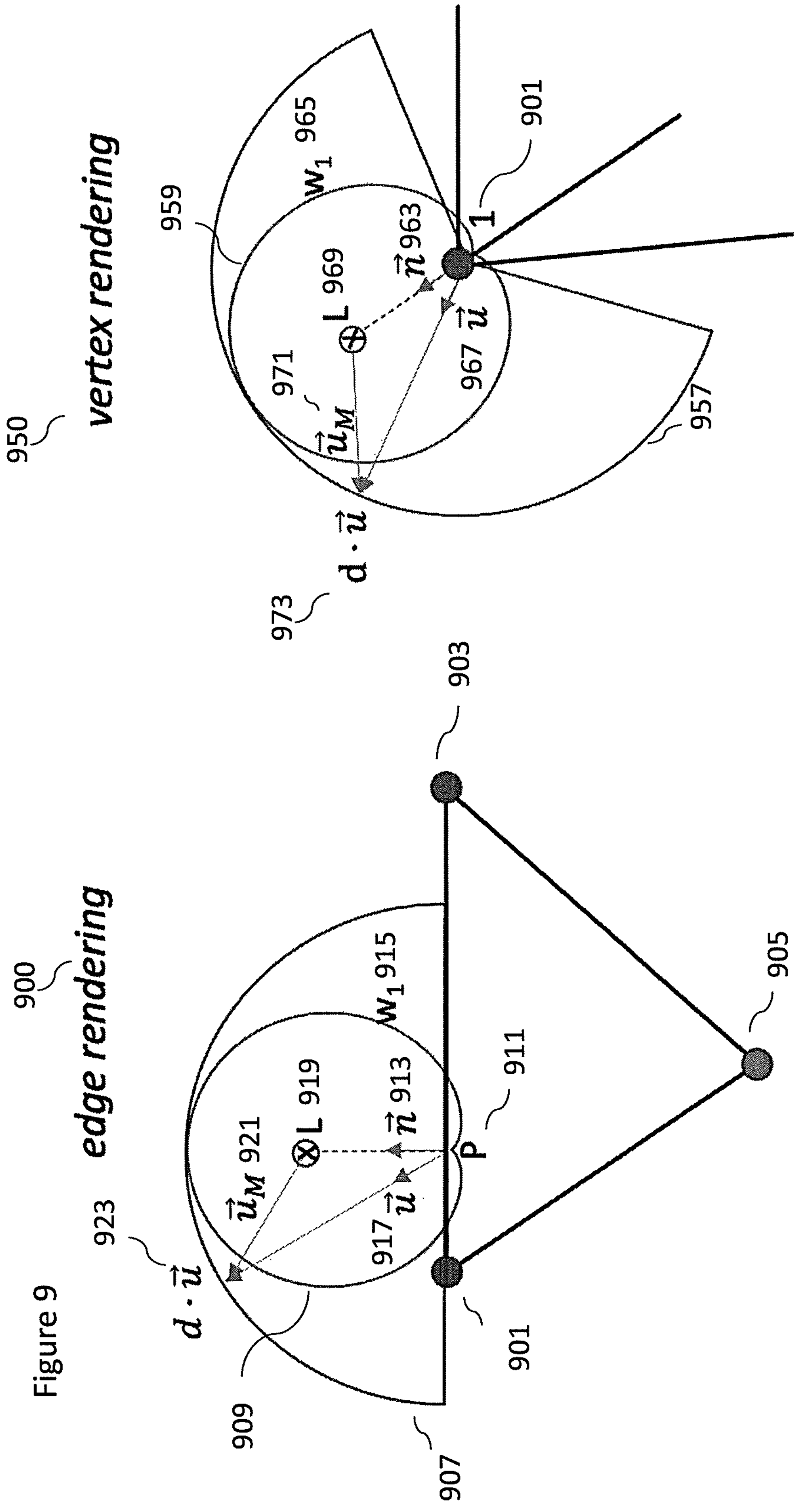
FIG. 9 shows schematically interpolation of original and projected parameters for listener position for example edge rendering according to some embodiments.

This is shown for example in FIG. 9 in which the left side shows the edge rendering situation 900. In this example there are microphone-array locations shown as circles Array 1 901, Array 2 903, Array 3 905 and the listener at listener position 919 outside of the region defined by the microphone array positions and within the region extending from the (vector) line between Array 1 901 and Array 2 903. Additionally is shown the normal $\vec{n}$ 913, the DOA $\vec{u}$ 917 and the mapped DOA $\vec{u}_M$ 921, the directional weighting function $w_1$ 915 and the product of the DOA $\vec{u}$ and distance d, $d\cdot\vec{u}$ 923.

The edge normal $\vec{n}$ 913 indicating the exterior of the array is shown as purpendicular for ease of visualization, while in practice it may lean more towards the vertex normals depending on the listener position.

The right side shows the vertex rendering situation 950. In this example there is a microphone-array location or position shown as circle Array 1 901 and the listener at listener position 969 outside of the region defined by the microphone array positions and outside the regions extending from the (vector) lines between Array 1 901 (and any other array). Additionally is shown the normal if 963, the DOA $\vec{u}$ 967 and the mapped DOA $\vec{u}_M$ 971. The directional weighting function $w_1$ 965 and the product of the DOA $\vec{u}$ and distance d, $d\cdot\vec{u}$ 973. The range 907/957 shows the surface on which the directions are mapped by the metadata direction to position mapper 411. In this example, the surface is a simple sphere, so it has a constant radius.

Although it is always possible to construct an exterior boundary between all the microphones-array positions that is convex (convex hull), sometimes the resulting edges are not efficient, for example the edge can be too long for effective spatial interpolation between the connected microphone-arrays. In some embodiments the outer edges can be removed resulting in non-convex hull arrangement. In such situations the derived normals can lose their usefulness since they do not necessarily point outwards from the interior. In some embodiments therefore the non-convex edge normals and connecting vertices can be replaced with normals of the omitted edge.

Figure 10:
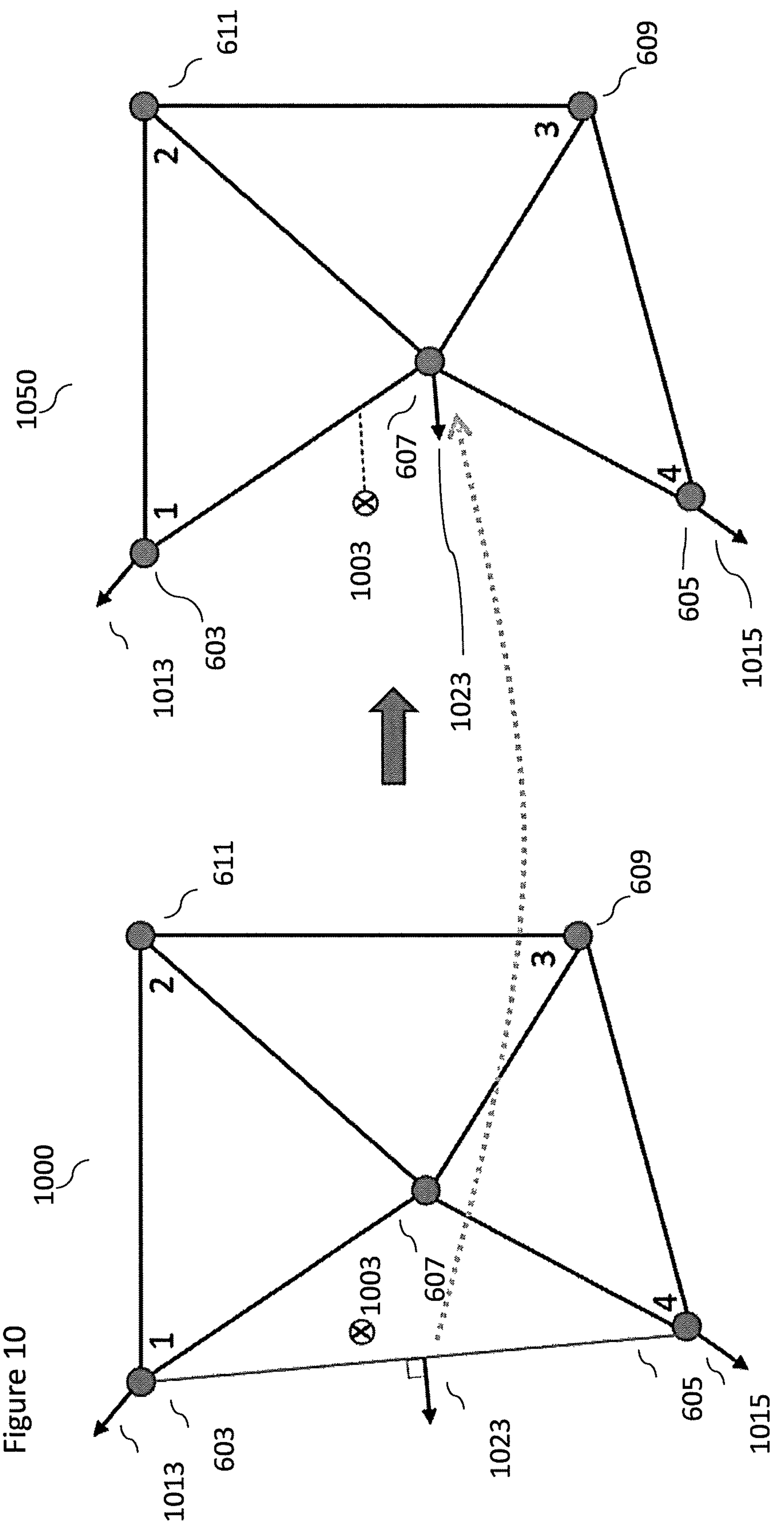
FIG. 10 shows schematically example normals for omitted edges in non-convex shape arrangements of microphone-arrays according to some embodiments.

This, for example, is shown with respect to FIG. 10 where there is shown an example arrangement 1000 with microphone-array positions (shown as circles Array 1 603, Array 2 611, Array 3 609, Array 4 605 and Array 5 607) and a listener at listener position 1003. Additionally is shown an example 'long' edge 1001 between the Array 1 603 and Array 4 605. There is furthermore a vertex normal 1013 associated with Array 1 603 and a vertex normal 1015 associated with Array 4 and example interpolated or weighted edge normals 1021, 1023, and 1025 located along the 'long' edge 1001.

Further is shown a modified arrangement 1050 where the example arrangement 1000 is modified by the removal of the example 'long' edge 1001. This results in a non-convex arrangement and the listener position 1003 is now located outside of the region defined by the microphone-array positions. Furthermore the new non-convex normals (not shown) along the two new short edges, a first 'short' edge defined by the line between the Array 1 603 and Array 5 607 positions and a second 'short' edge defined by the line between the Array 5 607 and Array 4 605 positions do not point outwards. Thus as shown in FIG. 10 the original dropped edge normal 1023 is copied to all microphones on the new exterior edges (replacing the dropped or deleted edge). In such embodiments the listener is projected to one of the new exterior edges, and the new vector pointing outwards is determined as before by interpolating the microphone normals around the edge (which can be the copied microphone normals or original microphone normals).

Additionally in some embodiments, apart from determining a modified exterior vector pointing outwards, the process of projecting the listener to the edges or microphones is treated differently for non-convex boundaries. After omitting an edge, if the listener is projected purpendicularly to the new edges under the omitted one, as is done normally for the convex exterior of the array region, then there will be locations at which the listener is projected simultaneously to two edges, rather than one which is the preferred behaviour. In order to avoid that, the listener is always projected to the new edges not purpendicularly to them, but purpendicularly to the original dropped edge (see FIG. 11), resulting on projection to a unique non-convex edge.

Figure 11:
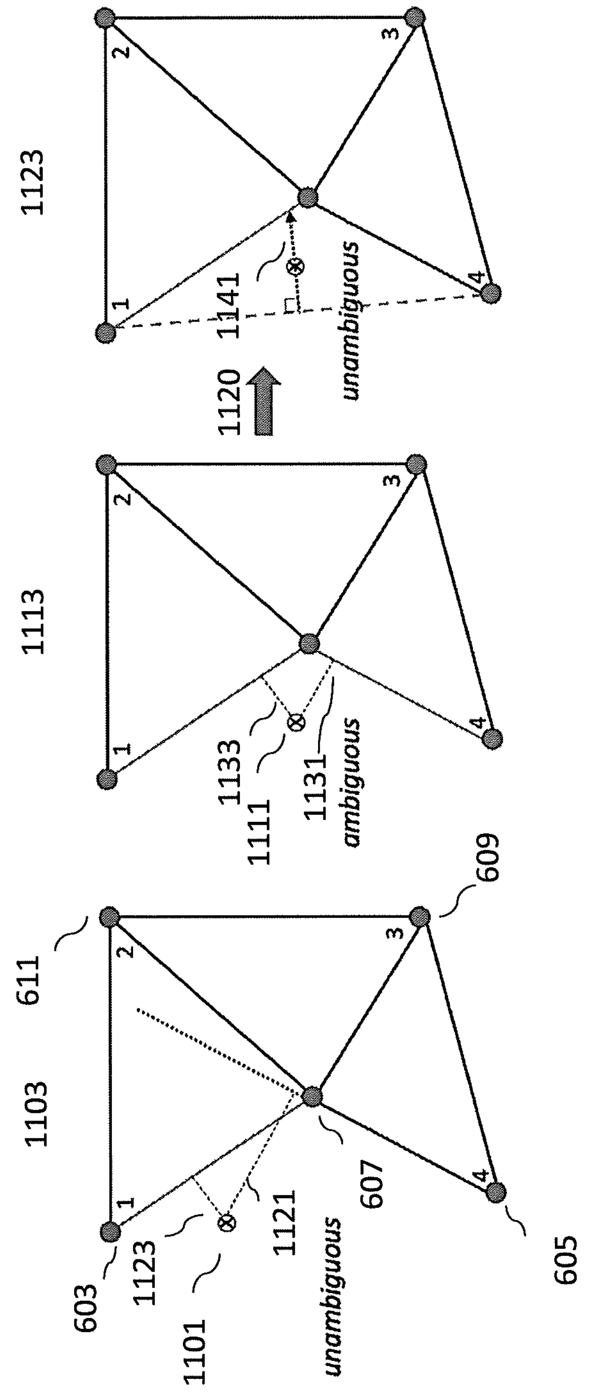
FIG. 11 shows schematically example edge/vertex selections for non-convex shape arrangements of microphone-arrays according to some embodiments.

This, for example, is shown with respect to FIG. 11 where there is shown an example 'unambiguous' arrangement 1103 with microphone-array positions (shown as circles Array 1 603, Array 2 611, Array 3 609, Array 4 605 and Array 5 607) and a listener at listener position 1101 outside of the microphone-array region. In this example is shown a 'valid' projection 1123 to the first 'short' edge defined by the line between the Array 1 603 and Array 5 607 positions and an 'invalid' projection 1121 with respect to a second 'short' edge defined by the line between the Array 5 607 and Array 4 605 positions.

There is shown an example 'ambiguous' arrangement 1113 with the same microphone-array positions and a listener at listener position 1111 outside of the microphone-array region where there are two 'valid' projections, a first projection 1133 to the first 'short' edge defined by the line between the Array 1 603 and Array 5 607 positions and a second projection 1131 with respect to a second 'short' edge defined by the line between the Array 5 607 and Array 4 605 positions.

This, based on the above described embodiment, can be resolved as shown by the example arrangement 1123 by the implementation of, a perpendicular projection from the omitted edge to the listener which will intersect with one of the new edges. In other words the listener is projected 1141 to the new edges not perpendicularly to them, and perpendicularly to the original dropped or deleted edge and which results in a projection to a unique non-convex edge.

Figure 12A:
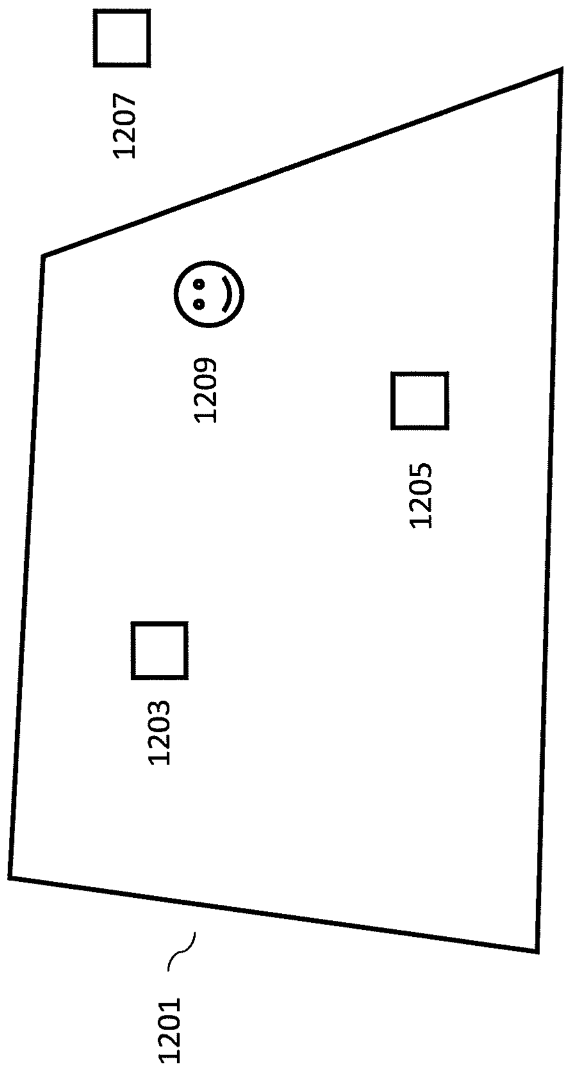
FIGS. 12*a* to 12*c* show respectively an example scenario wherein a user is within an area determined by the microphone-arrays, a user outside the area defined by the microphone-arrays and a user outside the area defined by the microphone-arrays according to some embodiments.
Figure 12B:
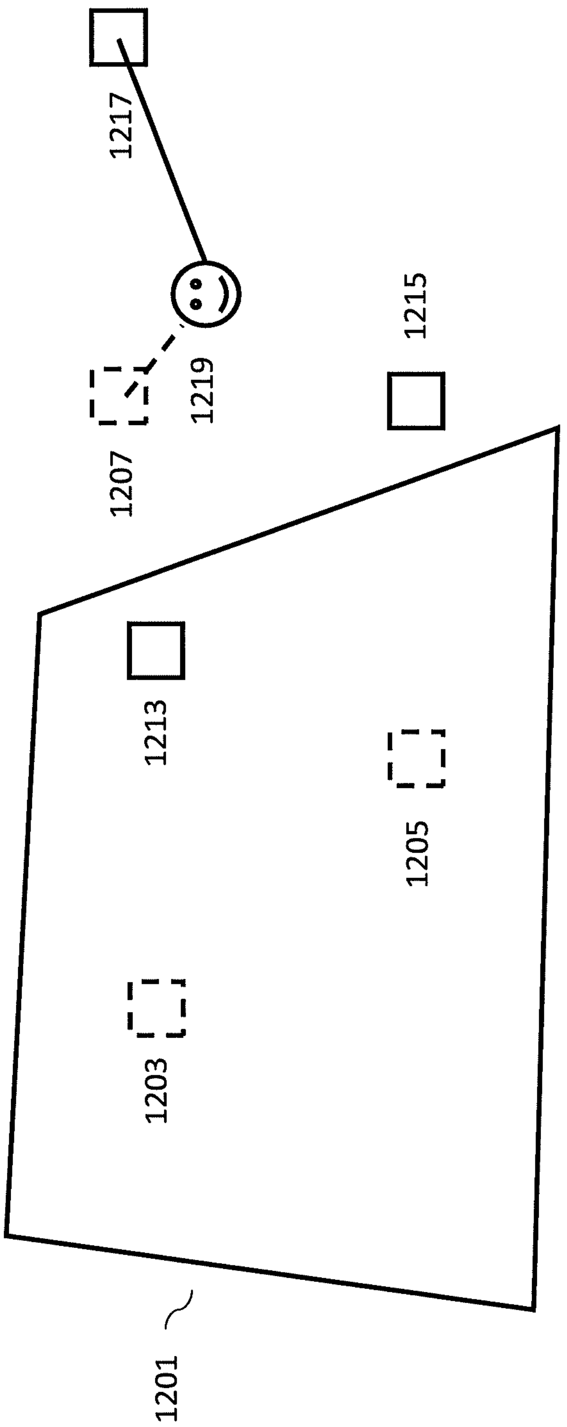
Figure 12C:
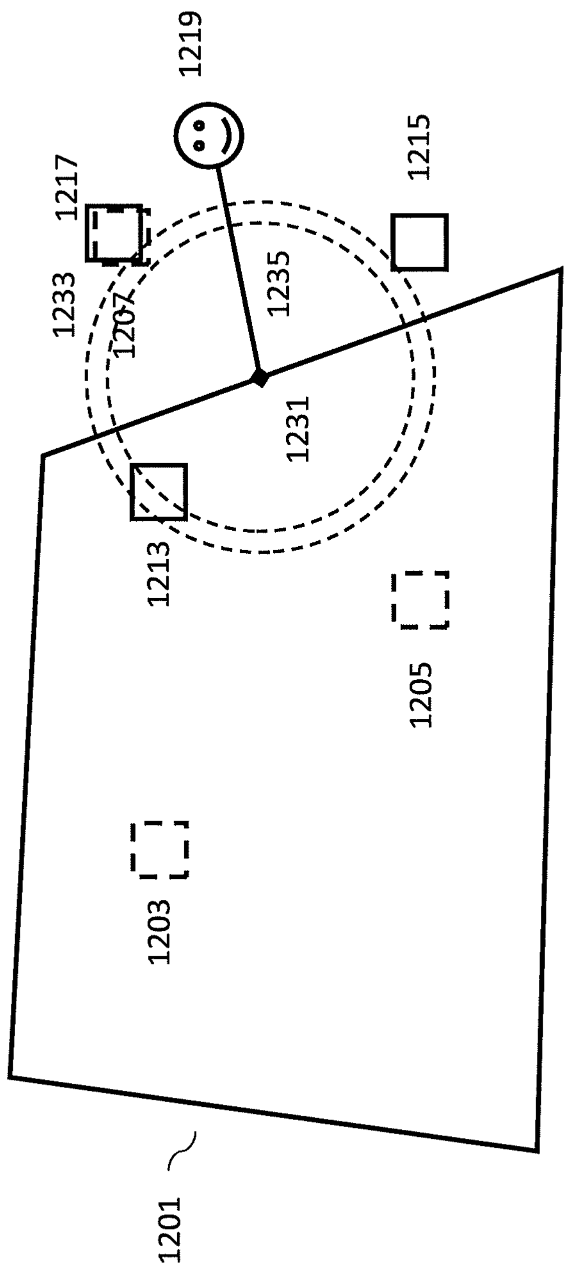

The practical effect of the embodiments is depicted with respect to FIGS. 12*a* to 12*c*.

FIG. 12*a* shows, for example, where the listener 1209 is inside the area 1201 spanned by the microphone arrays (not shown), where the sound sources (shown as sources 1203, 1205 within the area and 1207 outside the area) are reproduced at the correct directions.

FIG. 12*b* shows, where the listener 1219 has now moved outside the area 1201 l spanned by the microphone arrays (not shown). The conventional rendering approach is one where the sound sources, the rendered sources 1213, 1215, 1217 marked by solid boxes, have moved with the listener from the original sources 1203, 1205, 1207 positions respectively. The sound sources in this example are reproduced at erroneous directions and it can be confusing for the listener to understand where the sound sources are.

For example although the rendered source 1213 is roughly in the right direction with respect to the listener 1219 position when compared to the direction of the source 1203 with respect to the listener 1219 position, the direction of the the source 1217 position is approximately opposite the direction of the source 1207 with respect to the listener 1219 position. Furthermore although the sound sources can be rendered to be less directional, it does not help with navigation and may even make it more difficult.

FIG. 12*c* shows that using the embodiments as described above the listener position 1219 is first projected 1235 to the edge 1231 of the area 1201. Then, the sound sources outside the area (the sound source 1207) are mapped on the surface of a sphere 1233. Then, these mapped sources are rendered at those directions from the listener position perspective. Moreover as discussed above the mapped sound sources near the listener position are made less directional. The sound sources inside the area (1203, 1205) are rendered less modified (based on the projected position). As a result, the sound sources inside the area are rendered as point-like sources from roughly the correct directions, and thus they can be used to navigate towards the area. The sound sources outside the area are rendered at plausible locations (even though not necessarily exactly the correct ones), and they are made less directional when the listener is near them. Thus, they are not confusing the listener, but provide some plausible localization.

Figure 13:
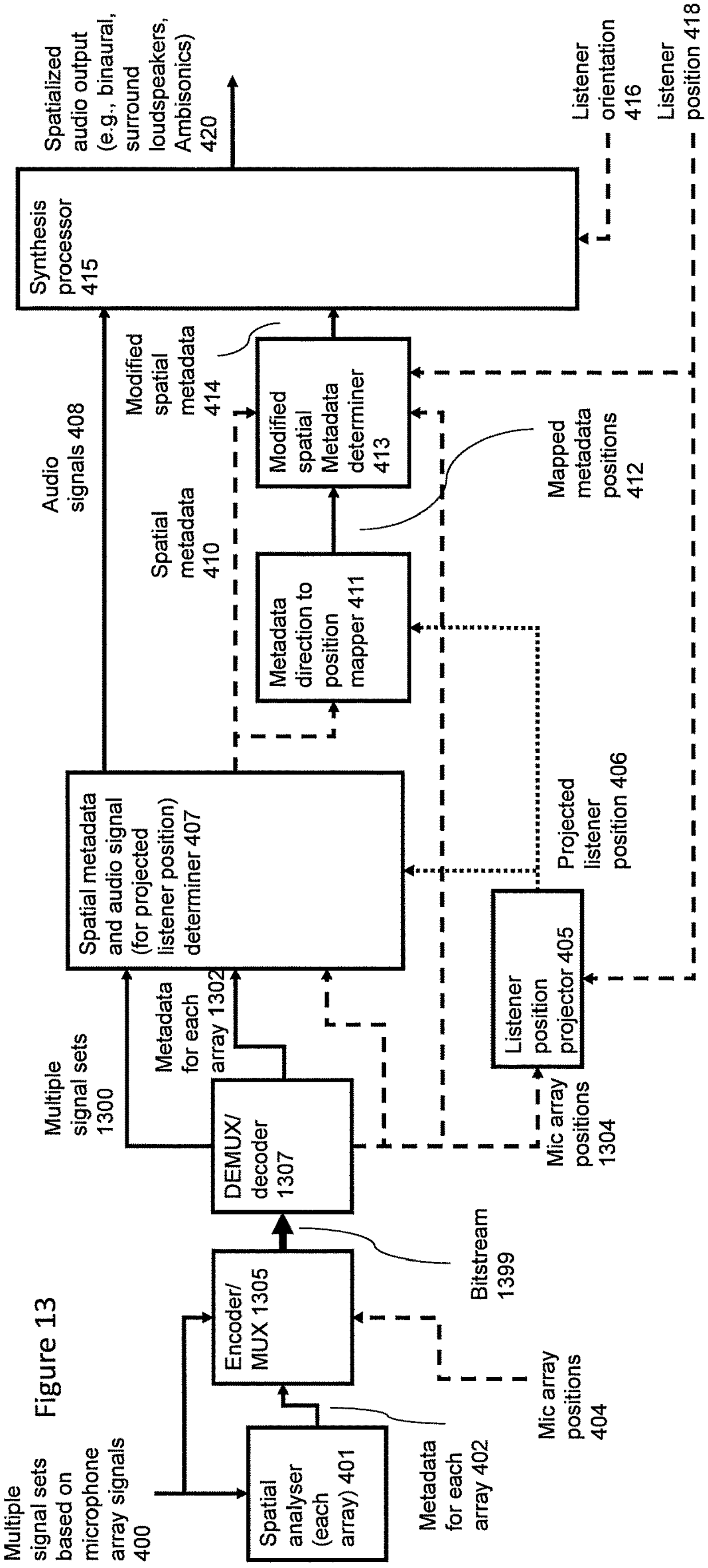
FIG. 13 shows apparatus suitable for implementing some embodiments wherein a capture apparatus can be separate from the rendering apparatus elements.

Although the example apparatus shown in FIG. 4 is shown implemented in a single apparatus, it can be possible that the capture and processing/rendering parts are implemented in physically separate or at different times. For example with respect to FIG. 13 is shown a variant of the embodiment shown in FIG. 4. In this embodiment the difference between the two examples is the addition of an encoder/multiplexer 1305 and decoder/demultiplexer 1307.

The encoder/multiplexer 1305 is configured to receive the Multiple signal sets based on microphone array signals 400, the Metadata for each array 402 and the Microphone array positions 404 and apply a suitable encoding scheme for the audio signals, for example, any methods to encode Ambisonic signals that have been described in context of MPEG-H, that is, ISO/IEC 23008-3:2019 Information technology—High efficiency coding and media delivery in heterogeneous environments—Part 3: 3D audio. The encoder/multiplexer 1305 in some embodiments may also downmix or otherwise reduce the number of audio channels to be encoded. Furthermore, the encoder/multiplexer 1305 in some embodiments can quantize and encode the spatial metadata 402 and the array position 404 information and embed the encoded result to a bit stream 1399 along with the encoded audio signals. The bit stream 1399 may further be provided at the same media container with encoded video signals. The encoder/multiplexer 1305 can then be configured to output (for example transmit or store) the bit stream 1399.

In some embodiments, based on the employed bit rate, the encoder/multiplexer 1305 can be configured to omit the encoding of some of the signal sets, and if that is the case, also omit encoding the corresponding array positions and metadata.

The decoder/demultiplexer 1307 can be configured to receive (or retrieve or otherwise obtain) the Bit stream 1399 and decode and demultiplex the Multiple signal sets based on microphone array 1300 (and provides them to the spatial metadata and audio signals for projected listener position determiner 407), the Microphone array positions 1304 (and provides them to the listener position projector 405 and the spatial metadata and audio signals for projected listener position determiner 407) and the Metadata for each array 1302 (and provides them to the spatial metadata and audio signals for projected listener position determiner 407).

Figure 14:
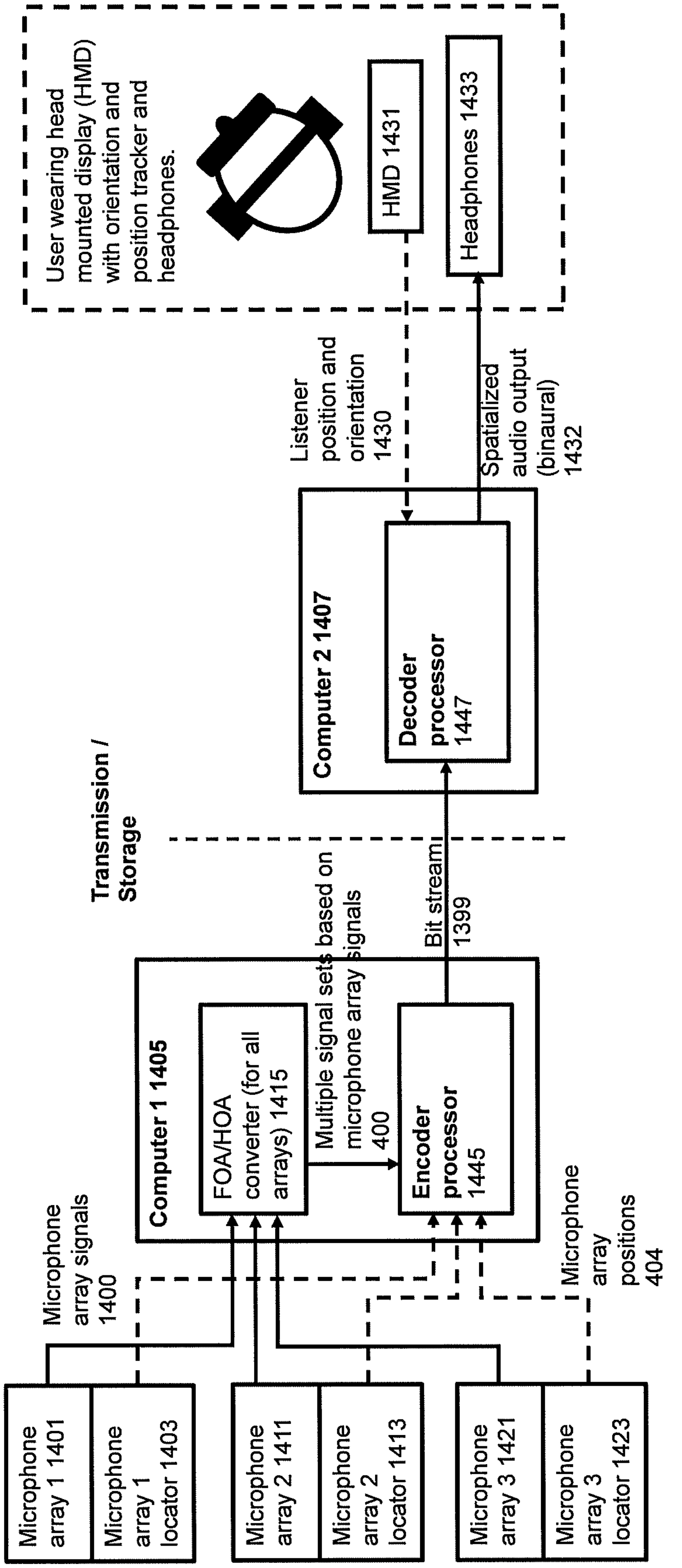
FIG. 14 shows schematically suitable apparatus for implementing some embodiments.

With respect to FIG. 14 is shown an example application of the encoder and decoder embodiments of FIG. 13 (and the embodiments of FIG. 4).

In this example, there are three microphone arrays, which could for example be spherical arrays with sufficient number of microphones (e.g., 30 or more), or VR cameras (e.g., OZO from the Nokia Corporation or similar) with microphones mounted on its surface. Thus is shown microphone array 1 1401, microphone array 2 1411 and microphone array 3 1421 configured to output audio signals to computer 1 1405 (and in this example FOA/HOA converter 1415).

Furthermore each array is equipped also with a locator providing the positional information of the corresponding array. Thus is shown microphone array 1 locator 1403, microphone array 2 locator 1413 and microphone array 3 locator 1423 configured to output location information to computer 1 1405 (and in this example encoder processor 1305).

The system in FIG. 14 further comprises a computer, computer 1 1405 comprising a FOA/HOA converter 1415 configured to convert the array signals to first-order Ambisonic (FOA) or higher-order Ambisonic (HOA) signals. Converting microphone array signals to Ambisonic signals is known and not described in detail herein but if the arrays were for example Eigenmikes, there are available means to convert the microphone signals to an Ambisonic form.

The FOA/HOA converter 1415 outputs the converted Ambisonic signals in the form of Multiple signal sets based on microphone array signals 400, to the encoder processor 1305 which may operate as the encoder processor as described above.

The microphone array locator 1403, 1413, 1423 is configured to provide the Microphone array position information to the Encoder processor in computer 1 1405 through a suitable interface, for example, through a Bluetooth connection. In some embodiments the array locator also provides rotational alignment information, which could be provided to rotationally align the FOA/HOA signals at computer 1 1405.

The encoder processor 1445 at computer 1 1405 is configured to process the multiple signal sets based on microphone array signals and microphone array positions as described in context of FIG. 13 (or FIG. 4) and provide the encoded bit stream 1399 as an output. In other words the encoder processor 1445 can in some embodiments comprise both the Spatial analyser (each array) 401 and Encoder/MUX 1305.

The bit stream 1399 may be stored and/or transmitted, and then the decoder processor 1447 of computer 2 1407 is configured to receive or obtain from the storage the bit stream 1399. The Decoder processor 1447 may also obtain listener position and orientation information from the position/orientation tracker of a HMD (head mounted display) 1431 that the user is wearing. The decoder processor 1447 thus in some embodiments comprises the DEMUX/decoder 1307 and other remaining blocks as shown in FIG. 13.

Based on the bit stream 1399 and listener position and orientation information 1430, the decoder processor 1447 of computer 2 1407 is configured to generate the binaural spatialized audio output signal 1432 and provide them, via a suitable audio interface, to be reproduced over the headphones 1433 the user is wearing.

In some embodiments, computer 2 1407 is the same device as computer 1 1405, however, in a typical situation they are different devices or computers. A computer in this context may refer to a desktop/laptop computer, a processing cloud, a game console, a mobile device, or any other device capable of performing the processing described in the present invention disclosure.

In some embodiments, the bit stream 1399 is an MPEG-I bit stream. In some other embodiments, it may be any suitable bit stream.

In some embodiments the listener position may be tracked with respect to the captured audio environment/or captured audio scene. For example, the listener may have a tracker attached, which provides a location and orientation of the listener's head. Then based on this location and orientation information, the audio may be rendered to the listener in a way as if he/she would be moving in the captured audio environment. It should be noted that the listener does not typically actually move in the captured audio environment, but instead is moving in the environment where he/she is physically located. Hence, the movements may be only relative movements and the listener motion can be scaled (up/down) to represent a motion within the capture environment according the scenario. Moreover, it should be noted that the captured audio environment may also be virtual, instead of being a real environment. In other words rather than reflecting a physical space the captured audio environment is a simulated, generated or augmented space. Furthermore, it should be noted also the movement of the listener may be virtual. For example, the listener may indicate movement using a suitable user input such as a keyboard, mouse or using any suitable input device.

Figure 15:
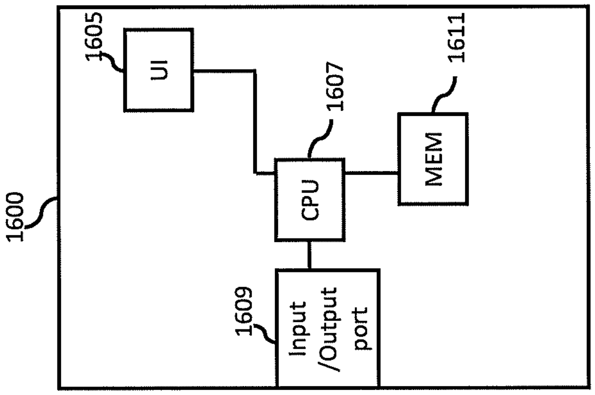
FIG. 15 shows schematically an example device suitable for implementing the apparatus shown.

With respect to FIG. 15 an example electronic device which may be used as the computer, encoder processor, decoder processor or any of the functional blocks described herein is shown. The device may be any suitable electronics device or apparatus. For example in some embodiments the device 1600 is a mobile device, user equipment, tablet computer, computer, audio playback apparatus, etc.

In some embodiments the device 1600 comprises at least one processor or central processing unit 1607. The processor 1607 can be configured to execute various program codes such as the methods such as described herein.

In some embodiments the device 1600 comprises a memory 1611. In some embodiments the at least one processor 1607 is coupled to the memory 1611. The memory 1611 can be any suitable storage means. In some embodiments the memory 1611 comprises a program code section for storing program codes implementable upon the processor 1607. Furthermore in some embodiments the memory 1611 can further comprise a stored data section for storing data, for example data that has been processed or to be processed in accordance with the embodiments as described herein. The implemented program code stored within the program code section and the data stored within the stored data section can be retrieved by the processor 1607 whenever needed via the memory-processor coupling.

In some embodiments the device 1600 comprises a user interface 1605. The user interface 1605 can be coupled in some embodiments to the processor 1607. In some embodiments the processor 1607 can control the operation of the user interface 1605 and receive inputs from the user interface 1605. In some embodiments the user interface 1605 can enable a user to input commands to the device 1600, for example via a keypad. In some embodiments the user interface 1605 can enable the user to obtain information from the device 1600. For example the user interface 1605 may comprise a display configured to display information from the device 1600 to the user. The user interface 1605 can in some embodiments comprise a touch screen or touch interface capable of both enabling information to be entered to the device 1600 and further displaying information to the user of the device 1600.

In some embodiments the device 1600 comprises an input/output port 1609. The input/output port 1609 in some embodiments comprises a transceiver. The transceiver in such embodiments can be coupled to the processor 1607 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE b 802.X, a suitable short-range radio frequency communication protocol such as Bluetooth, or infrared data communication pathway (IRDA).

The transceiver input/output port 1609 may be configured to transmit/receive the audio signals, the bitstream and in some embodiments perform the operations and methods as described above by using the processor 1607 executing suitable code.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media, and optical media.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:

at least one processor; and at least one memory storing instructions that, when executed with the at least one processor, cause the apparatus to:

obtain two or more audio signal sets, wherein each of the two or more audio signal sets is associated with a respective audio signal set position;

obtain a listener position within an audio environment, wherein the audio environment comprises one or more areas having one or more inside and outside regions in relation to the respective audio signal set positions, wherein the one or more inside regions are defined with the respective audio signal set positions;

obtain, for at least two of the two or more audio signal sets, metadata based on a processing of at least two audio signals of the at least two of the two or more audio signal sets;

determine, for the listener position within an audio environment outside the one or more inside regions, a second listener position, the second listener position located in the one or more outside regions and closer towards a boundary of the one or more inside and outside regions, or on the boundary, or within the one or more inside regions; and output the at least two audio signals and modified spatial metadata based, at least partially, on the listener position and the second listener position.

2. The apparatus as claimed in claim 1, wherein outputting the at least two audio signals and the modified spatial metadata comprises the instructions, when executed with the at least one processor, cause the apparatus to:

determine modified metadata for the second listener position based on the metadata;

determine at least two audio signals for the second listener position based on the at least two audio signals; and determine the modified spatial metadata for the listener position based on the modified metadata for the second listener position;

wherein determining the modified spatial metadata comprises the instructions, when executed with the at least one processor, cause the apparatus to:

determine at least one audio position with respect to the second listener position based on the modified metadata for the second listener position, wherein the modified metadata for the second listener position comprises a direction parameter representing a direction from the second listener position to one of the at least one audio position; and determine the modified spatial metadata for the listener position based on at least one audio signal set position with respect to the second listener position, wherein the modified spatial metadata comprises a spatial direction parameter representing a direction from the listener position to the one of the at least one audio position.

3. The apparatus as claimed in any of claim 1, wherein obtaining the two or more audio signal sets comprises the instructions, when executed with the at least one processor, cause the apparatus to:

obtain the two or more audio signal sets from microphone arrangements, wherein each microphone arrangement is at a respective position and comprises one or more microphones.

4. The apparatus as claimed in claim 1, wherein obtaining the listener position comprises the instructions, when executed with the at least one processor, cause the apparatus to:

obtain the listener position from a further apparatus.

5. The apparatus as claimed in claim 1, wherein obtaining, for the at least two of the two or more audio signal sets, the metadata comprises the instructions, when executed with the at least one processor, cause the apparatus to:

determine a directional parameter based on processing of the at least two audio signals.

6. The apparatus as claimed in claim 1, wherein determining the second listener position comprises the instructions, when executed with the at least one processor, cause the apparatus to:

determine the second listener position at a location of one of:

within a plane or volume at least partially defined with an edge or surface linking audio signal set positions of the two of the two or more audio signal sets and the listener position;

within a plane or volume at least partially defined with an edge or surface linking the audio signal set positions of the two of the two or more audio signal sets within an associated inside region;

on an edge or surface defined with the audio signal set positions of the two of the two or more audio signal sets; or at a closest of the audio signal set positions of the two of the two or more audio signal sets.

7. The apparatus as claimed in claim 2, wherein determining the modified metadata for the second listener position comprises the instructions, when executed with the at least one processor, cause the apparatus to:

generate at least two interpolation weights based on the audio signal set positions and the second listener position;

apply the at least two interpolation weights to respective audio signal set audio metadata to generate interpolated audio metadata; and combine the interpolated audio metadata to generate the modified metadata for the second listener position.

8. The apparatus as claimed in claim 7, wherein determining the modified spatial metadata for the listener position based on the modified metadata for the second listener position comprises the instructions, when executed with the at least one processor, cause the apparatus to:

map the modified metadata based on the second listener position to a cartesian co-ordinate system.

9. The apparatus as claimed in claim 2, wherein determining the at least two audio signals for the second listener position comprises the instructions, when executed with the at least one processor, cause the apparatus to:

generate interpolated audio signals from the at least two audio signals.

10. The apparatus as claimed in claim 2, wherein determining the modified spatial metadata for the listener position based on the at least one audio signal set position with respect to the second listener position comprises the instructions, when executed with the at least one processor, cause the apparatus to:

determine the spatial direction parameter based on one of:

an interpolated difference between the at least one audio position with respect to the second listener position and the listener position; or a difference between: the listener position; and the at least one audio position with respect to the second listener position.

11. The apparatus as claimed in claim 10, wherein determining the modified spatial metadata for the listener position comprises the instructions, when executed with the at least one processor, cause the apparatus to:

modify at least one direct-to-total energy ratio based on the difference between the at least one audio position with respect to the second listener position and the listener position.

12. The apparatus as claimed in claim 2, wherein the instructions, when executed with the at least one processor, cause the apparatus to:

process the at least two audio signals based on the modified spatial metadata for the listener position to generate a spatial audio output.

13. The apparatus as claimed in claim 12, wherein processing the at least two audio signals to generate the spatial audio output comprises the instructions, when executed with the at least one processor, cause the apparatus to:

generate at least one of:

a binaural audio output comprising two audio signals for headphones and/or earphones;

an Ambisonic audio output comprising a plurality of audio signals for an Ambisonic renderer for the headphones or a multichannel speaker set; or a multichannel audio output comprising at least two audio signals for the multichannel speaker set.

14. A method for an apparatus for generating a spatialized audio output based on a listener position, the method comprising:

obtaining two or more audio signal sets, wherein each of the two or more audio signal sets is associated with a respective audio signal set position;

obtaining the listener position within an audio environment, wherein the audio environment comprises one or more areas having one or more inside and outside regions in relation to the respective audio signal set positions, wherein the one or more inside regions are defined with the respective audio signal set positions;

obtaining, for at least two of the two or more audio signal sets, metadata based on a processing of at least two audio signals of the at least two of the two or more audio signal sets;

determining, for the listener position within an audio environment outside the one or more inside regions, a second listener position, the second listener position located in the one or more outside regions and closer towards a boundary of the one or more inside and outside regions, or on the boundary, or within the one or more inside regions; and outputting the at least two audio signals and modified spatial metadata based, at least partially, on the listener position and the second listener position.

15. The method as claimed in claim 14, wherein the outputting of the at least two audio signals and the modified spatial metadata comprises:

determining modified metadata for the second listener position based on the metadata;

determining at least two audio signals for the second listener position based on the at least two audio signals; and determining the modified spatial metadata for the listener position based on the modified metadata for the second listener position;

wherein the determining of the modified spatial metadata for the listener position based on the modified metadata for the second listener position comprises:

determining at least one audio position with respect to the second listener position based on the modified metadata for the second listener position, wherein the modified metadata for the second listener position comprises a direction parameter representing a direction from the second listener position to one of the at least one audio position; and determining the modified spatial metadata for the listener position based on at least one audio signal set position with respect to the second listener position, wherein the modified spatial metadata comprises a spatial direction parameter representing a direction from the listener position to the one of the at least one audio position.

16. The method as claimed in claim 14, wherein the obtaining of the two or more audio signal sets comprises obtaining the two or more audio signal sets from microphone arrangements, wherein each microphone arrangement is at a respective position and comprises one or more microphones.

17. The method as claimed in claim 14, wherein the obtaining of the listener position comprises obtaining the listener position from a further apparatus.

18. The method as claimed in claim 14, wherein the obtaining, for the at least two of the two or more audio signal sets, of the metadata comprises determining a directional parameter based on the processing of the at least two audio signals.

19. The method as claimed in claim 14, wherein the determining of the second listener position comprises:

determining the second listener position at a location of one of:

within a plane or volume at least partially defined with an edge or surface linking audio signal set positions of the two of the two or more audio signal sets and the listener position;

within a plane or volume at least partially defined with an edge or surface linking the audio signal set positions of the two of the two or more audio signal sets within an associated inside region;

on an edge or surface defined with the audio signal set positions of the two of the two or more audio signal sets; or at a closest of the audio signal set positions of the two of the two or more audio signal sets.

20. The method as claimed in claim 15, wherein the determining of the modified metadata for the second listener position comprises:

generating at least two interpolation weights based on the audio signal set positions and the second listener position;

applying the at least two interpolation weights to respective audio signal set audio metadata to generate interpolated audio metadata; and combining the interpolated audio metadata to generate the modified metadata for the second listener position.

21. A non-transitory computer readable medium comprising program instructions that, when executed with the apparatus, cause the apparatus to perform the method as claimed in claim 14.

* * * * *